(12) United States Patent
Zhang et al.

(10) Patent No.: US 12,479,320 B2
(45) Date of Patent: Nov. 25, 2025

(54) CHARGING SYSTEM AND ELECTRIC VEHICLE

(71) Applicant: Huawei Digital Power Technologies Co., Ltd., Shenzhen (CN)

(72) Inventors: Xueliang Zhang, Xi'an (CN); Yang Cheng, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 957 days.

(21) Appl. No.: 17/579,935

(22) Filed: Jan. 20, 2022

(65) Prior Publication Data

US 2022/0216723 A1 Jul. 7, 2022

(30) Foreign Application Priority Data

Jan. 21, 2021 (CN) .......................... 202110083917.2

(51) Int. Cl.
*B60L 53/24* (2019.01)
*H02J 7/04* (2006.01)
*H02M 3/158* (2006.01)

(52) U.S. Cl.
CPC ............... *B60L 53/24* (2019.02); *H02J 7/04* (2013.01); *H02M 3/1582* (2013.01)

(58) Field of Classification Search
CPC ....................................................... B60L 53/24
USPC ......................................................... 320/140
See application file for complete search history.

(56) References Cited

U.S. PATENT DOCUMENTS

| 4,920,475 A | 4/1990 | Rippel |
| 10,369,900 B1 * | 8/2019 | Conlon ................. B60L 53/14 |
| 2014/0062183 A1 | 3/2014 | Ichikawa |

FOREIGN PATENT DOCUMENTS

| CN | 110949157 A | 4/2020 |
| CN | 110971173 A | 4/2020 |
| CN | 111267650 A | 6/2020 |
| CN | 111347887 A | 6/2020 |
| CN | 111347890 A | 6/2020 |
| CN | 111347926 A | 6/2020 |
| CN | 111660875 A | 9/2020 |
| CN | 215793212 U | 2/2022 |
| RU | 2738965 C1 | 12/2020 |

* cited by examiner

*Primary Examiner* — Eric D Lee

(74) *Attorney, Agent, or Firm* — WOMBLE BOND DICKINSON (US) LLP

(57) ABSTRACT

This application provides a charging system and an electric vehicle. The charging system includes a motor control unit (MCU) and a first inductor. A first bridge arm in the MCU and the first inductor constitute a voltage conversion circuit. When a power supply voltage is less than a minimum charging voltage of a power battery, the MCU may perform boost conversion on the power supply voltage by using the voltage conversion circuit, and output the power supply voltage obtained after boost conversion to the power battery as a first output voltage, where the first output voltage is not less than the minimum charging voltage. In this application, space occupied by the charging system and costs of the charging system can be reduced while the charging system is used to perform boost conversion on the power supply voltage.

12 Claims, 17 Drawing Sheets

CHARGING SYSTEM AND ELECTRIC VEHICLE

CROSS-REFERENCE TO RELATED APPLICATIONS

This application claims priority to Chinese Patent Application No. 202110083917.2, filed on Jan. 21, 2021, which is hereby incorporated by reference in its entirety.

TECHNICAL FIELD

This application relates to the field of new energy vehicle technologies, and in particular, to a charging system and an electric vehicle.

BACKGROUND

With development of new energy technologies, electric vehicles have received increasingly more attention. A power battery is disposed in the electric vehicle, and the power battery can receive and store electric energy provided by a charging pile, and in a traveling process of the electric vehicle, the power battery releases the stored electric energy to drive the electric vehicle to travel.

To improve a charging speed of the electric vehicle, increasingly more electric vehicles use an 800 V high-voltage power battery. A maximum battery voltage of the power battery is 800 V, and a charging voltage required by the power battery may exceed 800 V. However, currently, most fast direct current charging piles in the market have an output voltage of 500 V. These charging piles cannot directly charge the 800 V high-voltage power battery. As a result, the electric vehicle equipped with the high-voltage power battery faces a difficulty of being charged, which is not conducive to improvement in user experience.

Therefore, currently, a charging solution to the electric vehicle needs to be studied.

SUMMARY

In view of this, the application provides a charging system and an electric vehicle. When a power supply voltage is less than a minimum charging voltage of a power battery, the electric vehicle can still support the power supply voltage in charging the power battery.

According to a first aspect, the application provides a charging system, including a motor control unit MCU and a first inductor. The MCU includes N bridge arms, and N is an integer greater than or equal to one. High-potential ends of the N bridge arms are connected to a first power supply end and a first battery end of the charging system, the first power supply end may be connected to a positive electrode of a direct current power supply, the first battery end may be connected to a positive electrode of a power battery, the direct current power supply may output a power supply voltage, and the power battery may receive a first output voltage of the charging system. Low-potential ends of the N bridge arms are connected to a second battery end of the charging system, and the second battery end may be connected to a negative electrode of the power battery. One end of the first inductor is connected to a second power supply end, the other end of the first inductor is connected to a middle point of a first bridge arm, the second power supply end may be connected to a negative electrode of the direct current power supply, and the first bridge arm is any of the N bridge arms. The N bridge arms in the MCU and the first inductor constitute a voltage conversion circuit. When the power supply voltage is less than a minimum charging voltage of the power battery, the MCU may perform boost conversion on the power supply voltage by using the voltage conversion circuit, and output the power supply voltage obtained after boost conversion to the power battery as the first output voltage, where the first output voltage is not less than the minimum charging voltage.

In conclusion, in the application, the MCU is multiplexed to implement a charging system. When the power supply voltage is less than the minimum charging voltage of the power battery, the charging system may perform boost conversion on the power supply voltage to obtain the first output voltage that is not less than the minimum charging voltage. In this case, the first output voltage can be adapted to the power battery, so as to charge the power battery. In addition, in the application, the common MCU in an electric vehicle is multiplexed, which helps reduce space occupied by the charging system and costs of the charging system.

For example, the first aspect of the application provides the following examples for description.

Example 1

The first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. When the power supply voltage is less than the minimum charging voltage, the MCU may turn on the first switch transistor, so that the first inductor is charged; and the MCU turns off the first switch transistor, so that the first inductor discharges electricity.

When the MCU turns on the first switch transistor, current is output from the positive electrode of the direct current power supply, and reaches the first inductor after passing through the first switch transistor, so that the first inductor is charged. When the MCU turns off the first switch transistor, the first inductor starts to discharge electricity. The current is output from an end that is of the first inductor and that is close to the second power supply end, and flows back to an end that is of the first inductor and that is close to the second switch transistor after being transmitted by the direct current power supply, the power battery, and a diode in the second switch transistor. In this process, the direct current power supply and the first inductor are connected in series to discharge electricity, and the first output voltage is the sum of the power supply voltage and a voltage of the first inductor. Apparently, the first output voltage is greater than the power supply voltage, and therefore, boost conversion can be implemented.

It can be understood that the power supply voltage provided by the direct current power supply may fall within a charging voltage range of the power battery, that is, the power supply voltage is adapted to the power battery. To be compatible with this scenario, the charging system in the application may include a first switch. A first end of the first switch is connected to the second battery end, and a second end of the first switch is connected to the second power supply end. The MCU may turn on the first switch when the power supply voltage falls within the charging voltage range of the power battery, and turn off the first switch when the power supply voltage is beyond the charging voltage range of the power battery.

When the first switch is turned on, the power battery can be directly connected to the direct current power supply. Therefore, the power battery can directly receive the power supply voltage provided by the direct current power supply to complete charging. Therefore, the first switch may be turned on when the power supply voltage falls within the charging voltage range of the power battery. When the first switch is turned off, the MCU may convert the power supply voltage, and provide the converted power supply voltage to the power battery as the first output voltage. Therefore, the first switch may be turned off when the power supply voltage is beyond the charging voltage range of the power battery.

To adapt to a high power scenario, the charging system may include N first inductors and N third switches. One end of each of the N third switches is connected to the second power supply end, the other end of each of the N third switches is connected to one end of each of the N first inductors in a one-to-one correspondence, and the other end of each of the N first inductors is connected to the N bridge arms in a one-to-one correspondence. The N third switches may be turned on when the power supply voltage is received, and may be turned off when receiving of the power supply voltage is stopped.

When the N third switches are turned on, charging and discharging of the N first inductors may be separately controlled by using the N bridge arms. In other words, the N first inductors may be connected in parallel to transmit power, so as to adapt to the high power scenario. When receiving of the power supply voltage is stopped, the N third switches are turned off, so that the N first inductors are disconnected from each other, thereby helping reduce impact of the N first inductors on an inverter function of the MCU.

Example 2

It is foreseeable that in some scenarios, the power supply voltage may be greater than a maximum charging voltage of the power battery. In view of this, in the application, when the power supply voltage is greater than the maximum charging voltage of the power battery, the MCU may perform buck conversion on the power supply voltage by using the voltage conversion circuit, and output the power supply voltage obtained after buck conversion to the power battery as the first output voltage, where the first output voltage is not greater than the maximum charging voltage. In this case, the electric vehicle can receive a relatively large power supply voltage. After the power supply voltage is converted, the converted power supply voltage charges the power battery, thereby helping improve charging convenience.

For example, the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system may include a first switch and a second switch. A first end of the first switch is connected to the second battery end, a second end of the first switch is connected to the second power supply end, a first end of the second switch is connected to the first battery end, a second end of the second switch is connected to one end of the first inductor, and a third end of the second switch is connected to the first power supply end.

Based on the charging system, when the power supply voltage is greater than the maximum charging voltage, the MCU may turn on the first switch, and turn on the first end and the second end of the second switch; the MCU turns on the first switch transistor, so that the first inductor is charged; and the MCU turns off the first switch transistor, so that the first inductor discharges electricity.

After the MCU turns on the first switch transistor, the first inductor can be charged. In this case, the first output voltage is a voltage difference obtained after a voltage of the first inductor is subtracted from the power supply voltage. After the MCU turns off the first switch transistor, the first inductor can discharge electricity. In this case, the first output voltage is the voltage of the first inductor. It can be learned that the first output voltage is always less than the power supply voltage. Therefore, the charging system can perform buck conversion on the power supply voltage.

It should be noted that the charging system provided in Example 2 may also perform boost conversion on the power supply voltage. For example, the charging system may include a third switch. A first end of the third switch is connected to one end of the first inductor, and a second end of the third switch is connected to the second power supply end. When the power supply voltage is less than the minimum charging voltage, the MCU may turn on the first end and the third end of the second switch, turn on the third switch, and turn off the first switch; the MCU turns on the first switch transistor, so that the first inductor is charged; and the MCU turns off the first switch transistor, so that the first inductor discharges electricity.

After the MCU turns on the first switch transistor, the first inductor can be charged. After the MCU turns off the first switch transistor, the first inductor can discharge electricity. In this case, the first output voltage is the sum of the voltage of the first inductor and the power supply voltage. It can be learned that the first output voltage is greater than the power supply voltage. Therefore, the charging system can perform boost conversion on the power supply voltage.

In addition, the charging system provided in Example 2 may also perform buck-boost conversion on the power supply voltage. For example, the charging system may include a third switch. A first end of the third switch is connected to one end of the first inductor, and a second end of the third switch is connected to the second power supply end. The MCU may turn on the first end and the second end of the second switch, and turn on the third switch; the MCU turns on the first switch transistor, so that the first inductor is charged; and the MCU turns off the first switch transistor, so that the first inductor discharges electricity.

After the MCU turns on the first switch transistor, the first inductor can be charged. After the MCU turns off the first switch transistor, the first inductor can discharge electricity. In this case, the first output voltage is the voltage of the first inductor. The voltage of the first inductor depends on charging duration of the first inductor. Therefore, the first output voltage can be adjusted by adjusting the charging duration of the first inductor. The first output voltage may be greater than the power supply voltage (boost conversion), or may be less than the power supply voltage (buck conversion).

It can be understood that the charging system provided in Example 2 in the application may also be compatible with a scenario in which the power supply voltage matches the power battery. For example, when the power supply voltage falls within a charging voltage range of the power battery, the MCU may turn on the first end and the third end of the second switch, and turn on the first switch. In this case, the power battery is directly connected to the direct current power supply, and can directly receive the power supply voltage to complete charging.

According to a second aspect, the application provides a charging system, mainly including a motor control unit MCU and a first inductor. The MCU includes N bridge arms, and N is an integer greater than or equal to one. High-potential ends of the N bridge arms in the MCU are connected to a first power supply end and a first battery end of the charging system, the first power supply end may be connected to a positive electrode of a direct current load, the first battery end may be connected to a positive electrode of a power battery, the direct current load may receive a second output voltage of the charging system, and the power battery may output a battery voltage to the charging system. Low-potential ends of the N bridge arms in the MCU are connected to a second battery end of the charging system, and the second battery end may be connected to a negative electrode of the power battery. One end of the first inductor is connected to a second power supply end, the other end of the first inductor is connected to a first bridge arm, the second power supply end may be connected to a negative electrode of the direct current load, and the first bridge arm is any of the N bridge arms. The first bridge arm and the first inductor constitute a voltage conversion circuit. When the battery voltage is greater than a maximum working voltage of the direct current load, the MCU may perform buck conversion on the battery voltage by using the voltage conversion circuit, and output the battery voltage obtained after buck conversion to the direct current load as the second output voltage, where the second output voltage is not greater than the maximum working voltage.

In conclusion, in the application, the MCU is multiplexed to implement a charging system. When the battery voltage is greater than the maximum working voltage of the direct current load, the charging system may perform buck conversion on the battery voltage to obtain the second output voltage that is not greater than the maximum working voltage. In this way, the second output voltage can be adapted to the direct current load, so as to provide power to the direct current load. In addition, in the application, the common MCU in an electric vehicle is multiplexed, which helps reduce space occupied by the charging system and costs of the charging system.

For example, the second aspect of the application provides the following examples for description.

Example 1

For example, the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. When the battery voltage is greater than the maximum working voltage, the MCU may turn on the second switch transistor, so that the first inductor is charged; and the MCU turns off the second switch transistor, so that the first inductor discharges electricity.

After the MCU turns on the second switch transistor, the first inductor can be charged. In this case, the second output voltage is a voltage difference obtained after a voltage of the first inductor is subtracted from the battery voltage. After the MCU turns off the second switch transistor, the first inductor can discharge electricity. In this case, the first output voltage is the voltage of the first inductor. It can be learned that the first output voltage is always less than the battery voltage. Therefore, the charging system provided in Example 1 in the application can implement buck conversion on the battery voltage.

It can be understood that the battery voltage of the power battery may be adapted to the direct current load. To be compatible with this scenario, the charging system may include a first switch. A first end of the first switch is connected to the second battery end, and a second end of the first switch is connected to the second power supply end. The MCU may turn on the first switch when the battery voltage falls within a working voltage range of the direct current load, and turn off the first switch when the battery voltage is beyond the working voltage range of the direct current load.

When the first switch is turned on, the power battery can be directly connected to the direct current load, and can directly provide power to the direct current load. When the first switch is turned off, the MCU may convert the battery voltage, and provide the converted battery voltage to the direct current load as the second output voltage.

To adapt to a high power scenario, the charging system may include N first inductors and N third switches. One end of each of the N third switches is connected to the second power supply end, the other end of each of the N third switches is connected to one end of each of the N first inductors in a one-to-one correspondence, and the other end of each of the N first inductors is connected to the N bridge arms in a one-to-one correspondence. The N third switches may be turned on when the second output voltage is output, and may be turned off when outputting of the second output voltage is stopped.

When the N third switches are turned on, charging and discharging of the N first inductors may be separately controlled by using the N bridge arms. In other words, the N first inductors may be connected in parallel to transmit power, so as to adapt to the high power scenario. When receiving of the power supply voltage is stopped, the N third switches are turned off, so that the N first inductors are disconnected from each other, thereby helping reduce impact of the N first inductors on an inverter function of the MCU.

Example 2

It is foreseeable that in some scenarios, the battery voltage may be less than a minimum working voltage of the direct current load. In view of this, in the application, when the battery voltage is less than the minimum working voltage of the direct current load, the MCU may perform boost conversion on the battery voltage by using the voltage conversion circuit, and output the battery voltage obtained after boost conversion to the direct current load as the second output voltage, where the second output voltage is not less than the minimum working voltage.

For example, the first bridge arm in the MCU includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system may include a first switch and a second switch. A first end of the first switch is connected to the second battery end, a second end of the first switch is connected to the second power supply end, a first end of the second switch is connected to the first battery end, a second end of the second switch is connected to one end of the first inductor, and a third end of the second switch is connected to the first power supply end.

Based on the charging system, when the battery voltage is less than the minimum working voltage, the MCU may turn on the first switch, and turn on the first end and the second end of the second switch; the MCU turns on the second switch transistor, so that the first inductor is charged; and the MCU turns off the second switch transistor, so that the first inductor discharges electricity.

After the MCU turns on the second switch transistor, the first inductor can be charged. After the MCU turns off the second switch transistor, the first inductor can discharge electricity. In this case, the second output voltage is the sum of the battery voltage and a voltage of the first inductor. It can be learned that the second output voltage is greater than the battery voltage. Therefore, the charging system can perform boost conversion on the battery voltage.

It should be noted that the charging system provided in Example 2 may also perform buck conversion on the battery voltage. For example, the charging system may include a third switch. A first end of the third switch is connected to one end of the first inductor, and a second end of the third switch is connected to the second power supply end. When the battery voltage is greater than the maximum working voltage, the MCU may turn on the first end and the third end of the second switch, turn on the third switch, and turn off the first switch; the MCU turns on the second switch transistor, so that the first inductor is charged; and the MCU turns off the second switch transistor, so that the first inductor discharges electricity.

After the MCU turns on the second switch transistor, the first inductor can be charged. In this case, the second output voltage is a voltage difference obtained after the voltage of the first inductor is subtracted from the battery voltage. After the MCU turns off the second switch transistor, the first inductor can discharge electricity. In this case, the second output voltage is the voltage of the first inductor. It can be learned that the second output voltage is always less than the battery voltage. Therefore, the charging system can perform buck conversion on the battery voltage.

In addition, the charging system provided in Example 2 may also perform buck-boost conversion on the battery voltage. For example, the charging system may include a third switch. A first end of the third switch is connected to one end of the first inductor, and a second end of the third switch is connected to the second power supply end. The MCU may turn on the first end and the second end of the second switch, and turn on the third switch; the MCU turns on the second switch transistor, so that the first inductor is charged; and the MCU turns off the second switch transistor, so that the first inductor discharges electricity.

After the MCU turns on the second switch transistor, the first inductor can be charged. After the MCU turns off the second switch transistor, the first inductor can discharge electricity. In this case, the second output voltage is the voltage of the first inductor. The voltage of the first inductor depends on charging duration of the first inductor. Therefore, the second output voltage can be adjusted by adjusting the charging duration of the first inductor. The second output voltage may be greater than the battery voltage (boost conversion), or may be less than the battery voltage (buck conversion).

It can be understood that the charging system provided in Example 2 in the application may also be compatible with a scenario in which the battery voltage matches the direct current load. For example, when the battery voltage falls within a working voltage range of the power battery, the MCU may turn on the first end and the third end of the second switch, and turn on the first switch. In this case, the power battery is directly connected to the direct current load, and can directly provide power to the direct current load.

According to a third aspect, the application provides a charging system, mainly including a motor control unit MCU and a first inductor. The MCU includes N bridge arms, and N is an integer greater than or equal to one. High-potential ends of the N bridge arms are connected to a first battery end of the charging system, the first battery end may be connected to a positive electrode of a power battery, and the power battery may receive a first output voltage of the charging system. Low-potential ends of the N bridge arms are connected to a second battery end and a second power supply end of the charging system, the second battery end may be connected to a negative electrode of the power battery, the second power supply end may be connected to a negative electrode of a direct current power supply, and the direct current power supply may output a power supply voltage. One end of the first inductor is connected to a first power supply end, the other end of the first inductor is connected to a middle point of a first bridge arm, the first power supply end may be connected to a positive electrode of the direct current power supply, and the first bridge arm is any of the N bridge arms. The first bridge arm and the first inductor constitute a voltage conversion circuit. When the power supply voltage is less than a minimum charging voltage of the power battery, the MCU may perform boost conversion on the power supply voltage by using the voltage conversion circuit, and output the power supply voltage obtained after boost conversion to the power battery as the first output voltage, where the first output voltage is not less than the minimum charging voltage. When the power supply voltage is greater than a maximum charging voltage of the power battery, the MCU performs buck conversion on the power supply voltage by using the voltage conversion circuit, and outputs the power supply voltage obtained after buck conversion to the power battery as the first output voltage, where the first output voltage is not greater than the minimum charging voltage.

For example, the first bridge arm includes a first switch transistor and a second switch transistor. A first electrode of the first switch transistor is separately connected to the first battery end and the first power supply end, a second electrode of the first switch transistor is connected to a first electrode of the second switch transistor, and the middle point of the first bridge arm is located between the first switch transistor and the second switch transistor. The charging system includes a sixth switch and a fifth switch. A first end of the fifth switch is connected to the second battery end, a second end of the fifth switch is connected to the low-potential ends of the N bridge arms, a third end of the fifth switch is connected to one end of the first inductor, a first end of the sixth switch is connected to the first battery end, and a second end of the sixth switch is connected to the first power supply end.

When the power supply voltage is greater than the maximum charging voltage, the MCU may turn on the sixth switch, and turn on the first end and the third end of the fifth switch; the MCU turns on the second switch transistor, so that the first inductor is charged; and the MCU turns off the second switch transistor, so that the first inductor discharges electricity.

After the MCU turns on the second switch transistor, the first inductor can be charged. In this case, the second output voltage is a voltage difference obtained after a voltage of the first inductor is subtracted from the battery voltage. After the MCU turns off the second switch transistor, the first inductor can discharge electricity. In this case, the first output voltage is the voltage of the first inductor. It can be learned that the first output voltage is always less than the power supply voltage. Therefore, the charging system can perform buck conversion on the power supply voltage.

It should be noted that the charging system provided in the third aspect of the application may also perform boost conversion on the power supply voltage. For example, the charging system may include a fourth switch. A first end of the fourth switch is connected to one end of the first inductor, and a second end of the fourth switch is connected to the first power supply end. When the power supply voltage is less than the minimum charging voltage, the MCU may turn on the first end and the second end of the fifth switch, turn on the fourth switch, and turn off the sixth switch; the MCU turns on the second switch transistor, so that the first inductor is charged; and the MCU turns off the second switch transistor, so that the first inductor discharges electricity.

After the MCU turns on the second switch transistor, the first inductor can be charged. After the MCU turns off the second switch transistor, the first inductor can discharge electricity. In this case, the first output voltage is the sum of the voltage of the first inductor and the power supply voltage. It can be learned that the first output voltage is greater than the power supply voltage. Therefore, the charging system can perform boost conversion on the power supply voltage.

In addition, the charging system provided in the third aspect of the application may also perform buck-boost conversion on the power supply voltage. For example, the charging system may include a fourth switch. A first end of the fourth switch is connected to one end of the first inductor, and a second end of the fourth switch is connected to the first power supply end. The MCU may turn on the first end and the third end of the fifth switch, and turn on the fourth switch; the MCU turns on the second switch transistor, so that the first inductor is charged; and the MCU turns off the second switch transistor, so that the first inductor discharges electricity.

After the MCU turns on the second switch transistor, the first inductor can be charged. After the MCU turns off the second switch transistor, the first inductor can discharge electricity. In this case, the first output voltage is the voltage of the first inductor. The voltage of the first inductor depends on charging duration of the first inductor. Therefore, the first output voltage can be adjusted by adjusting the charging duration of the first inductor. The first output voltage may be greater than the power supply voltage (boost conversion), or may be less than the power supply voltage (buck conversion).

It can be understood that the charging system provided the third aspect of the application may also be compatible with a scenario in which the power supply voltage matches the power battery. For example, when the power supply voltage falls within a charging voltage range of the power battery, the MCU may turn on the first end and the second end of the fifth switch, and turn on the sixth switch. In this case, the power battery is directly connected to the direct current power supply, and can directly receive the power supply voltage to complete charging.

According to a fourth aspect, the application provides a charging system, mainly including a motor control unit MCU and a first inductor. The MCU includes N bridge arms, and N is an integer greater than or equal to one. High-potential ends of the N bridge arms are connected to a first battery end of the charging system, the first battery end may be connected to a positive electrode of a power battery, and the power battery may output a battery voltage to the charging system. Low-potential ends of the N bridge arms are connected to a second battery end and a second power supply end of the charging system, the second battery end may be connected to a negative electrode of the power battery, the second power supply end may be connected to a negative electrode of a direct current load, and the direct current load may receive a second output voltage of the charging system. One end of the first inductor is connected to a first power supply end, the other end of the first inductor is connected to a middle point of a first bridge arm, the first power supply end may be connected to a positive electrode of the direct current load, and the first bridge arm is any of the N bridge arms. The first bridge arm and the first inductor may constitute a voltage conversion circuit. When the battery voltage is greater than a maximum working voltage of the direct current load, the MCU may perform buck conversion on the battery voltage by using the voltage conversion circuit, and output the battery voltage obtained after buck conversion to the direct current load as the second output voltage, where the second output voltage is not greater than the maximum working voltage. When the battery voltage is less than a minimum working voltage of the direct current load, the MCU performs boost conversion on the battery voltage by using the voltage conversion circuit, and outputs the battery voltage obtained after boost conversion to the direct current load as the second output voltage, where the second output voltage is not less than the minimum working voltage.

For example, the first bridge arm in the MCU includes a first switch transistor and a second switch transistor. A first electrode of the first switch transistor is separately connected to the first battery end and the first power supply end, a second electrode of the first switch transistor is connected to a first electrode of the second switch transistor, and the middle point is located between the first switch transistor and the second switch transistor. The charging system includes a sixth switch and a fifth switch. A first end of the fifth switch is connected to the second battery end, a second end of the fifth switch is connected to the low-potential ends of the N bridge arms, a third end of the fifth switch is connected to one end of the first inductor, a first end of the sixth switch is connected to the first battery end, and a second end of the sixth switch is connected to the first power supply end.

Based on the charging system, when the battery voltage is less than the minimum working voltage, the MCU may turn on the sixth switch, and turn on the first end and the third end of the fifth switch; the MCU turns on the first switch transistor, so that the first inductor is charged; and the MCU turns off the first switch transistor, so that the first inductor discharges electricity.

After the MCU turns on the first switch transistor, the first inductor can be charged. After the MCU turns off the first switch transistor, the first inductor can discharge electricity. In this case, the second output voltage is the sum of the battery voltage and a voltage of the first inductor. It can be learned that the second output voltage is greater than the battery voltage. Therefore, the charging system can perform boost conversion on the battery voltage.

It should be noted that the charging system provided in the fourth aspect of the application may also perform buck conversion on the battery voltage. For example, the charging system may include a fourth switch. A first end of the fourth switch is connected to one end of the first inductor, and a second end of the fourth switch is connected to the first power supply end. When the battery voltage is greater than the maximum working voltage, the MCU may turn on the first end and the second end of the fifth switch, turn on the fourth switch, and turn off the sixth switch; the MCU turns on the second switch transistor, so that the first inductor is charged; and the MCU turns off the second switch transistor, so that the first inductor discharges electricity.

After the MCU turns on the first switch transistor, the first inductor can be charged. In this case, the second output voltage is a voltage difference obtained after the voltage of the first inductor is subtracted from the battery voltage. After the MCU turns off the first switch transistor, the first inductor can discharge electricity. In this case, the second output voltage is the voltage of the first inductor. It can be learned that the second output voltage is always less than the battery voltage. Therefore, the charging system can perform buck conversion on the battery voltage.

In addition, the charging system provided in the fourth aspect of the application may also perform buck-boost conversion on the battery voltage. For example, the charging system may include a fourth switch. A first end of the fourth switch is connected to one end of the first inductor, and a second end of the fourth switch is connected to the first power supply end. The MCU may turn on the first end and the third end of the fifth switch, and turn on the fourth switch; the MCU turns on the first switch transistor, so that the first inductor is charged; and the MCU turns off the first switch transistor, so that the first inductor discharges electricity.

After the MCU turns on the first switch transistor, the first inductor can be charged. After the MCU turns off the first switch transistor, the first inductor can discharge electricity. In this case, the second output voltage is the voltage of the first inductor. The voltage of the first inductor depends on charging duration of the first inductor. Therefore, the second output voltage can be adjusted by adjusting the charging duration of the first inductor. The second output voltage may be greater than the battery voltage (boost conversion), or may be less than the battery voltage (buck conversion).

It can be understood that the charging system provided in the fourth aspect of the application may also be compatible with a scenario in which the battery voltage matches the direct current load. For example, when the battery voltage falls within a working voltage range of the direct current load, the MCU may turn on the first end and the second end of the fifth switch, and turn on the sixth switch. In this case, the power battery is directly connected to the direct current load, and can directly provide power to the direct current load.

According to a fifth aspect, the application provides an electric vehicle, mainly including a power battery and the charging system provided in any one of the first aspect to the fourth aspect, where the charging system can charge the power battery.

These aspects or other aspects of the application are more readily apparent from the following description of embodiments.

DESCRIPTION OF EMBODIMENTS

To make objectives, technical solutions, and advantages of the application more clearly, the following describes this application in detail with reference to the accompanying drawings. An operation method in a method embodiment may also be applied to an apparatus embodiment or a system embodiment. It should be noted that in the description of this application, "at least one" means one or more, and "a plurality of" means two or more. In view of this, "a plurality of" may also be understood as "at least two" in the embodiments of the present disclosure. "And/or" describes an association relationship between associated objects and represents that three relationships may exist. For example, A and/or B may represent the following three cases: Only A exists, both A and B exist, and only B exists. In addition, unless otherwise specified, the character "I" usually indicates an "or" relationship between the associated objects. In addition, it should be understood that, in the description of this application, terms "first", "second", and the like are only used for a purpose of distinguishing between descriptions, but cannot be understood as an indication or implication of relative importance, and cannot be understood as an indication or implication of a sequence.

The following clearly describes the technical solutions in the embodiments of the application with reference to the accompanying drawings in the embodiments of the application.

Figure 1:
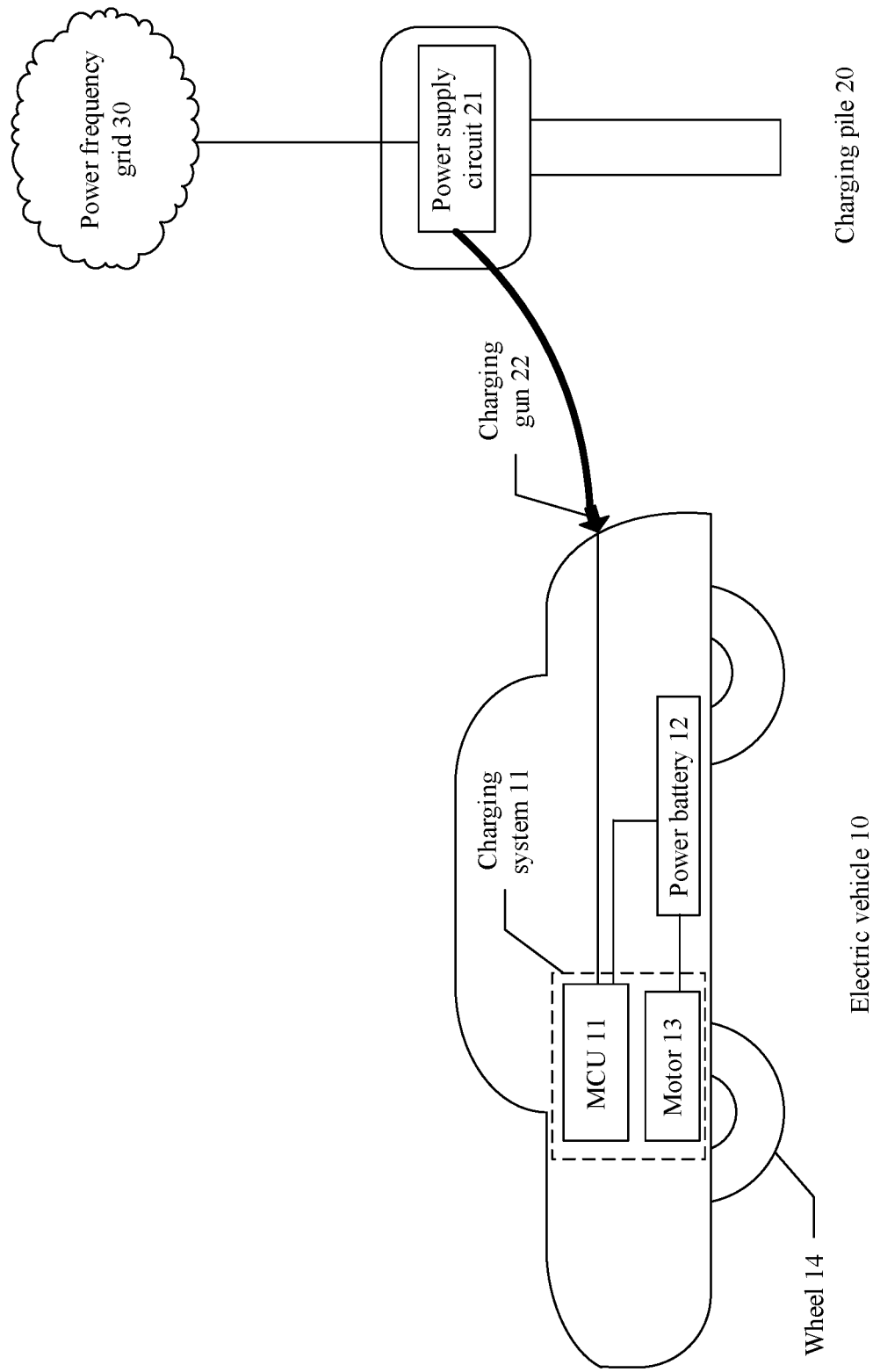
FIG. 1 is a schematic diagram of a charging scenario of an electric vehicle.

An electric vehicle, which may also be referred to as a new energy vehicle, is a vehicle driven by electric energy. As shown in FIG. 1, an electric vehicle 10 mainly includes a power battery 12, a motor 13, and a wheel 14. The power battery 12 is a battery with a large capacity and high power. When the electric vehicle 10 travels, the power battery 12 may provide power to the motor 13 by using a motor control unit (MCU) 111. The motor 13 converts electric energy provided by the power battery 12 into mechanical energy, to drive the wheel 14 to rotate, so that the vehicle travels.

When the electric vehicle 10 is charged, a charging pile 20 usually may be used to charge the electric vehicle 10. As shown in FIG. 1, the charging pile 20 mainly includes a power supply circuit 21 and a charging gun 22. One end of the power supply circuit 21 is connected to a power frequency grid 30, and the other end of the power supply circuit 21 is connected to the charging gun 22 through a cable. Currently, most charging piles 20 are direct current charging piles, and the power supply circuit 21 may convert alternating current provided by the power frequency grid 30 into direct current. An operator may insert the charging gun 22 into a charging socket of the electric vehicle 10, so that the charging gun 22 is connected to the power battery 12 in the electric vehicle 10, and then the power supply circuit 21 of the charging pile 20 can charge the power battery 12 by using the charging gun 22.

An output voltage of the charging pile 20 may be understood as a power supply voltage received by the electric vehicle 10. In a fast direct current charging scenario, the power supply voltage received by the electric vehicle 10 falls within a charging voltage range of the power battery 12, and the power battery 12 can directly use the output voltage of the charging pile 20 to complete charging.

A lower limit of the charging voltage range of the power battery 12 is a minimum charging voltage, and the minimum charging voltage may be understood as a minimum charging voltage value that can be adapted to the power battery 12. An upper limit of the charging voltage range of the power battery 12 is a maximum charging voltage, and the maximum charging voltage may be understood as a maximum charging voltage value that can be adapted to the power battery 12.

Currently, to improve a charging speed of the electric vehicle 10, a voltage level of the power battery 12 gradually increases from current 500 V to 800 V. Using the power battery 12 of an 800 V voltage level as an example, a battery voltage of the power battery 12 can reach 800 V, and a required charging voltage is usually not less than 800 V. However, currently, voltage levels of charging piles 20 that support fast direct current charging in the market are usually 500 V, that is, maximum output voltages of most charging piles 20 that support fast direct current charging are 500 V. As a result, many electric vehicles 10 equipped with a high-voltage power battery face a difficulty of being charged.

In view of this, the embodiments of the application provide a charging system 11, and the charging system 11 is connected to the power battery 12. When charging the electric vehicle 10, the charging system 11 may receive a power supply voltage. When the power supply voltage is less than the minimum charging voltage of the power battery 12, the charging system 11 may perform boost conversion on the power supply voltage, and provide the power supply voltage obtained after boost conversion to the power battery 12 as a first output voltage.

In the foregoing example, the output voltage of the charging pile 20 is 500 V, that is, the power supply voltage received by the charging system 11 is 500 V. Assuming that a charging voltage that can be adapted to the power battery 12 is 960 V, the charging system 11 may convert the power supply voltage into 960 V through boosting, to provide a 960 V first output voltage to the power battery 12, so that the power battery 12 can use the first output voltage to complete charging.

It should be noted that to reduce space occupied by the charging system 11 in the electric vehicle 10 and control costs of the charging system 11, the charging system 11 an embodiment of the application may be implemented based on the MCU 111 in the electric vehicle 10. The MCU 111 and the motor 13 are generally integrated into an electrical drive system. In other words, the charging system 11 in an embodiment of the application may be implemented by improving a conventional electrical drive system.

Figure 2:
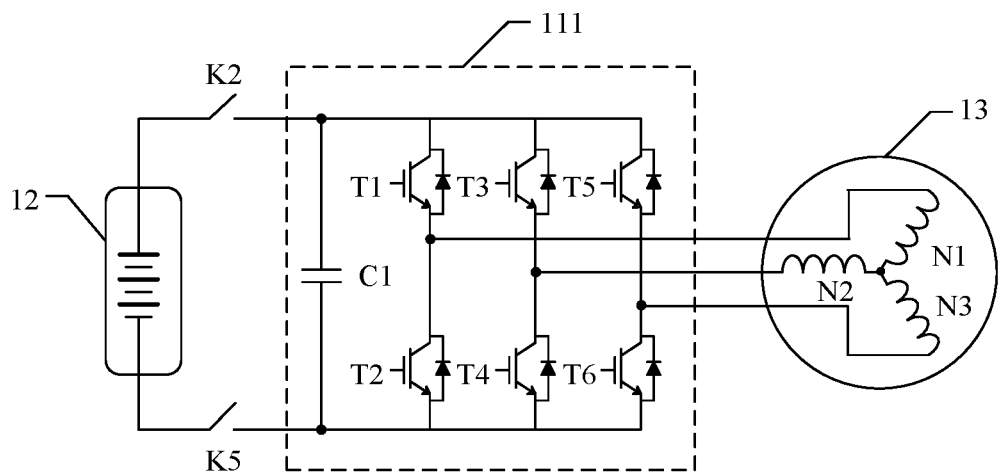
FIG. 2 is a schematic diagram of an electrical drive system.

The motor 13 converts electric energy into mechanical energy based on an electromagnetic induction effect. Therefore, a motor winding is disposed in the motor 13. Currently, there are three or six motor windings in the motor 13. A three-phase motor is used as an example. As shown in FIG. 2, the MCU 111 includes three bridge arms, the motor 13 includes three motor windings (N1 to N3), and the three bridge arms in the MCU 111 are respectively connected to the three motor windings in the motor 13 in a one-to-one correspondence.

A first bridge arm includes a switch transistor T1 and a switch transistor T2. A first electrode of the switch transistor T1 is configured to connect to a positive electrode of the power battery 12, a second electrode of the switch transistor T1 is connected to a first electrode of the switch transistor T2, and a second electrode of the switch transistor T2 is configured to connect to a negative electrode of the power battery 12. A middle point of the first bridge arm is a point connecting the switch transistor T1 and the switch transistor T2. The middle point of the first bridge arm is connected to one end of the motor winding N1.

A second bridge arm includes a switch transistor T3 and a switch transistor T4. A first electrode of the switch transistor T3 is configured to connect to the positive electrode of the power battery 12, a second electrode of the switch transistor T3 is connected to a first electrode of the switch transistor T4, and a second electrode of the switch transistor T4 is configured to connect to the negative electrode of the power battery 12. A middle point of the second bridge arm is a point connecting the switch transistor T3 and the switch transistor T4. The middle point of the second bridge arm is connected to one end of the motor winding N2.

A third bridge arm includes a switch transistor T5 and a switch transistor T6. A first electrode of the switch transistor T5 is configured to connect to the positive electrode of the power battery 12, a second electrode of the switch transistor T5 is connected to a first electrode of the switch transistor T6, and a second electrode of the switch transistor T6 is configured to connect to the negative electrode of the power battery 12. A middle point of the third bridge arm is a point connecting the switch transistor T5 and the switch transistor T6. The middle point of the third bridge arm is connected to one end of the motor winding N3, and the other ends of the three motor windings are connected to each other.

The MCU 111 includes a control board (not shown in the figure). The control board is separately connected to control electrodes of the switch transistor T1 to the switch transistor T6, to separately control on and off of the switch transistor T1 to the switch transistor T6, so that the three bridge arms can convert the battery voltage that is output by the power battery 12 into three-phase alternating current. Each bridge arm corresponds to one phase of the three-phase alternating current. The MCU 111 outputs the three-phase alternating current to the motor 13, so that the motor windings N1 to N3 generate a space rotational magnetic field, so as to drive a motor rotor to rotate, thereby converting electric energy into mechanical energy.

It should be noted that the switch transistor in an embodiment of the application may be one or more of a plurality of types of switch transistors such as a relay, a metal oxide semiconductor field effect transistor (MOSFET), a bipolar junction transistor (BJT), or an insulated gate bipolar transistor (IGBT), which are not enumerated one by one in an embodiment of the application. Each switch transistor may include a first electrode, a second electrode, and a control electrode. The control electrode is configured to control on or off of the switch transistor. When the switch transistor is turned on, current may be transmitted between the first electrode and the second electrode of the switch transistor. When the switch transistor is turned off, the current cannot be transmitted between the first electrode and the second electrode of the switch transistor. The IGBT is used as an example. In an embodiment of the application, the first electrode of the switch transistor may be a collector electrode, the second electrode of the switch transistor may be an emitter electrode, and the control electrode of the switch transistor may be a gate electrode.

Generally, as shown in FIG. 2, a switch K2 and a switch K5 may be disposed between the power battery 12 and the MCU 111. For example, the switch K2 and the switch K5 may be relays. The switch K2 and the switch K5 may be integrated with the power battery 12 in a battery pack, or may be independently disposed. This is not limited in an embodiment of the application.

One end of the switch K2 is connected to an anode of the power battery 12, and the other end of the switch K2 is connected to high-potential ends of the three bridge arms. One end of the switch K5 is connected to a cathode of the power battery 12, and the other end of the switch K5 is connected to low-potential ends of the three bridge arms. When the switch K2 and the switch K5 are turned on, the power battery 12 can provide power to the MCU 111. When the switch K2 and the switch K5 are turned off, the power battery 12 stops providing power to the MCU 111.

It can be learned from the foregoing description of the MCU 111 and the motor 13 that the MCU 111 includes N bridge arms, and N is an integer greater than or equal to one. It can be understood that when the electric vehicle 10 is charged, the electric vehicle 10 usually does not need to be moved. In other words, in this case, the MCU 111 does not need to provide the three-phase current to the motor 13. Therefore, in an embodiment of the application, the power battery 12 can be charged based on the N bridge arms in the MCU without affecting a traveling function of the electric vehicle 10.

Next, the charging system 11 provided in an embodiment of the application is described by using the following examples.

Embodiment 1

For example, a charging system 11 provided in an embodiment of the application includes an MCU 111 and a motor 13. The MCU 111 includes N bridge arms, the motor 13 includes N motor windings, the N bridge arms are respectively connected to the N motor windings in a one-to-one correspondence, and N is an integer greater than or equal to one.

Figure 3:
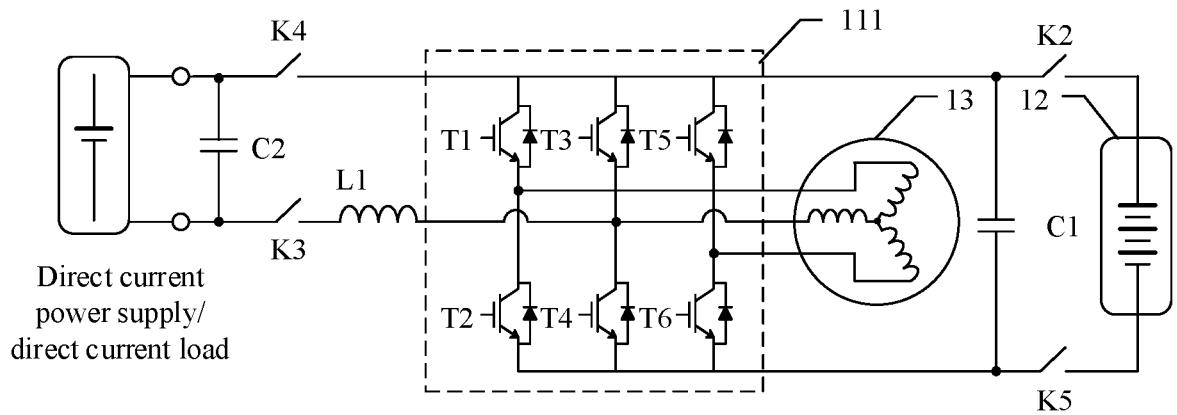
FIG. 3 is a schematic diagram of a charging system according to an embodiment of the application.

For example, N=3. As shown in FIG. 3, the charging system 11 includes the MCU 111 and the motor 13. A first battery end of the charging system 11 is connected to a positive electrode of the power battery 12, a second battery end of the charging system 11 is connected to a negative electrode of the power battery 12, a first power supply end of the charging system 11 is connected to a positive electrode of a direct current power supply, and a second power supply end of the charging system is connected to a negative electrode of the direct current power supply.

The direct current power supply may be a charging pile, another electric vehicle, or the like. This is not limited in an embodiment of the application. The direct current power supply can output a power supply voltage. The charging system 11 receives the power supply voltage by using the first power supply end and the second power supply end, converts the power supply voltage into a first output voltage adapted to the power battery 12, and outputs the first output voltage to the power battery 12 by using the first battery end and the second battery end. The power battery 12 can receive the first output voltage provided by the charging system 11 to complete charging.

As shown in FIG. 3, the MCU 111 includes three bridge arms. In an embodiment of the application, high-potential ends of the three bridge arms in MCU 111 are connected to the first power supply end, and low-potential ends of the three bridge arms are connected to the second battery end of the charging system 11. The charging system 11 includes an inductor L1. One end of the inductor L1 is connected to the second power supply end, and the other end of the inductor L1 is connected to a middle point of any bridge arm in the MCU 111. In the example shown in FIG. 3, the other end of the inductor L1 is connected to a middle point of a bridge arm 2 in which a switch transistor T3 and a switch transistor T4 are located.

In this case, the three bridge arms in the MCU 111 and the inductor L1 may constitute a voltage conversion circuit, so that the MCU 111 can control on and off of each of switch transistors T1 to T6, and the voltage conversion circuit converts the power supply voltage.

Therefore, when the power supply voltage is less than the minimum charging voltage of the power battery 12, the MCU 111 may perform boost conversion on the power supply voltage by using the voltage conversion circuit, and output the power supply voltage obtained after boost conversion to the power battery as the first output voltage, where the first output voltage is not less than the minimum charging voltage of the power battery 12.

For example, the power supply voltage is 500 V, and the minimum charging voltage of the power battery 12 is 960 V. The MCU 111 may convert the power supply voltage into 960 V or above 960 V through boosting to provide an adaptive first output voltage to the power battery 12, so that the power battery 12 can complete charging.

Generally, as shown in FIG. 3, the charging system 11 includes a switch K3 and a switch K4. The switch K3 and the switch K4 may also be referred to as fast contactors. One end of the switch K3 is connected to a point connecting motor windings N1 to N3, and the other end of the switch K3 is connected to the second power supply end. One end of the switch K4 is connected to the high-potential ends of the three bridge arms, and the other end of the switch K4 is connected to the first power supply end. When the switch K3 and the switch K4 are turned on, the direct current power supply can provide power to the charging system 11. When the switch K3 and the switch K4 are turned off, the direct current power supply can stop providing power to the charging system 11.

Next, the bridge arm 2 including the switch transistor T3 and the switch transistor T4 is used as an example to illustrate a boost conversion process. The middle point of the bridge arm 2 is a point connecting the switch transistor T3 and the switch transistor T4. One end of the inductor L1 is connected to the second power supply end, and the other end of the inductor L1 is connected to the middle point of the bridge arm 2. When boost conversion is performed on the power supply voltage, the following two stages are mainly included.

Stage 1: The inductor L1 is charged.

Figure 4:
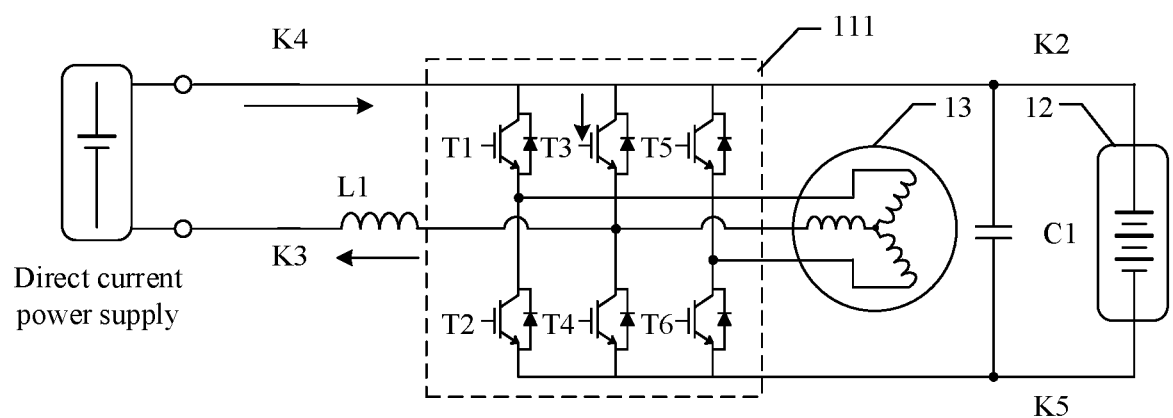
FIG. 4 shows a first boost conversion state of a charging system according to an embodiment of the application.

The MCU 111 may turn on the switch transistor T3 to charge the inductor L1. It can be understood that in this case, the switch transistor T4 is turned off. As shown in FIG. 4, current is output from the positive electrode of the direct current power supply, and flows back to the negative electrode of the direct current power supply after being transmitted by the switch transistor T3 and the inductor L1, so as to form a charging loop to charge the inductor L1.

Stage 2: The inductor L1 discharges electricity.

Figure 5:
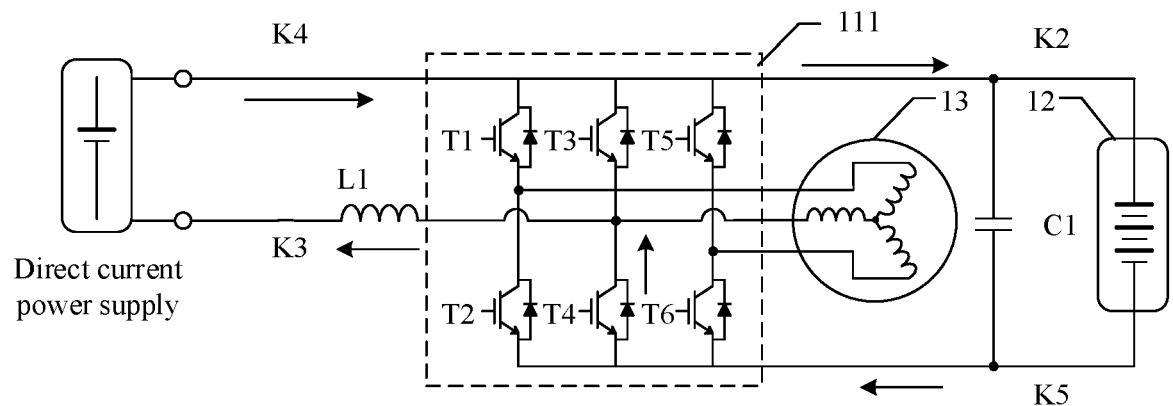
FIG. 5 shows a second boost conversion state of a charging system according to an embodiment of the application.

The MCU 111 may turn off the switch transistor T3, and the inductor L1 cannot continue to receive the current through the switch transistor T3. The inductor L1 starts to discharge electricity due to a freewheeling feature of the inductor. As shown in FIG. 5, the current is output from an end that is of the inductor L1 and that is close to the second power supply end, and flows back to an end that is of the inductor L1 and that is close to the switch transistor T4 after being transmitted by the direct current power supply, the power battery 12, and a diode in the switch transistor T4. In this process, the first output voltage of the charging system 11 is the sum of the power supply voltage of the direct current power supply and a voltage of the inductor L1. Apparently, the first output voltage is greater than the power supply voltage of the direct current power supply, so that boost conversion is implemented.

Figure 6:
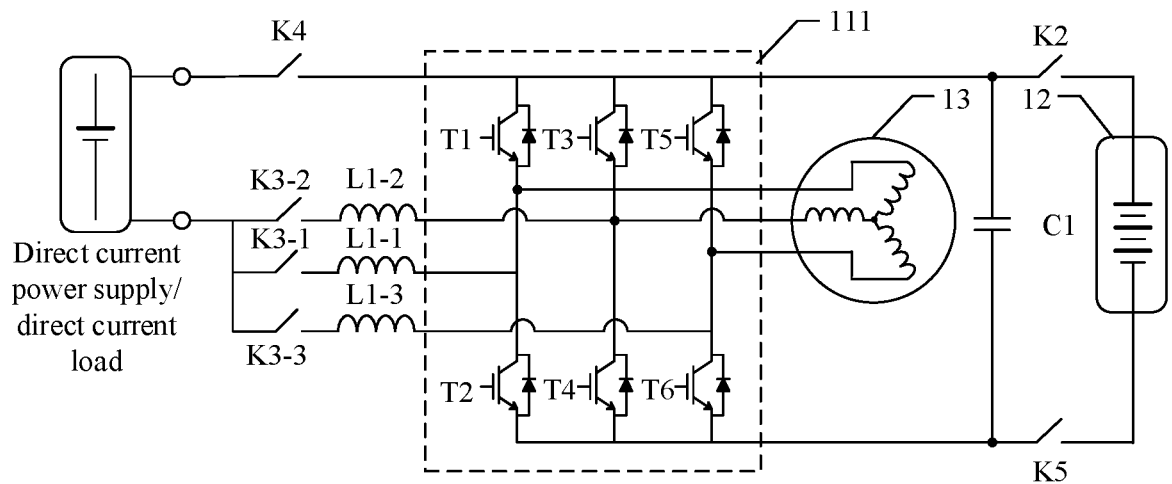
FIG. 6 is a schematic diagram of a charging system according to an embodiment of the application.

It can be understood that when power of the direct current power supply is relatively large, the MCU 111 may also synchronously control a plurality of bridge arms to perform boost conversion. For example, as shown in FIG. 6, the MCU 111 includes three inductors (inductors L1-1 to L1-3) and three switches K3 (a switch K3-1 to a switch K3-3). One end of each of the switches K3-1 to K3-3 is connected to the second power supply end, and the other end of each of the switches K3-1 to K3-3 is connected to one end of each of the three inductors (the inductors L1-1 to L1-3) in a one-to-one correspondence. The switch K3-1 is connected to one end of the inductor L1-1, the switch K3-2 is connected to one end of the inductor L1-2, and the switch K3-3 is connected to one end of the inductor L1-3.

The three inductors are respectively connected to middle points of the three bridge arms in the MCU 111 in a one-to-one correspondence. One end of the inductor L1-1 is connected to the second power supply end of the charging system 11, and the other end of the inductor L1-1 is connected to a middle point between the switch transistor T1 and the switch transistor T2. One end of the inductor L1-2 is connected to the second power supply end of the charging system 11, and the other end of the inductor L1-2 is connected to a middle point between the switch transistor T3 and the switch transistor T4. One end of the inductor L1-3 is connected to the second power supply end of the charging system 11, and the other end of the inductor L1-3 is connected to a middle point between the switch transistor T5 and the switch transistor T6.

When charging the power battery 12, the MCU 111 may turn on the switch K3-1 to the switch K3-3. The MCU 111 may synchronously control on and off of the switch transistor T1, the switch transistor T3, and the switch transistor T5, so that the inductor L1-1 to the inductor L1-3 are simultaneously charged and simultaneously discharge electricity. This case is equivalent to that the three inductors work in parallel to support voltage conversion in a high power scenario. After stopping charging the power battery 12, the MCU 111 may turn off the switch K3-1 to the switch K3-3. In this case, the inductor L1-1 to the inductor L1-3 are disconnected from each other, so that impact of the inductor L1-1 to the inductor L1-3 on an inversion process of the MCU 111 can be reduced.

In conclusion, the charging system 11 in an embodiment of the application may perform boost conversion on the power supply voltage of the direct current power supply to charge the high-voltage power battery 12, thereby helping improve convenience of charging the high-voltage power battery 12. In addition, in an embodiment of the application, the charging system 11 is implemented by multiplexing the N bridge arms in the MCU 111, thereby helping reduce space occupied by the charging system 11 and costs of the charging system 11.

It can be understood that the power supply voltage provided by the direct current power supply may be adapted to the power battery 12. For example, the charging voltage range of the power battery 12 is 700 V to 1000 V, and the power supply voltage of the direct current power supply (charging pile) is 800 V. In this case, boost conversion does not need to be performed on the power supply voltage.

Figure 7:
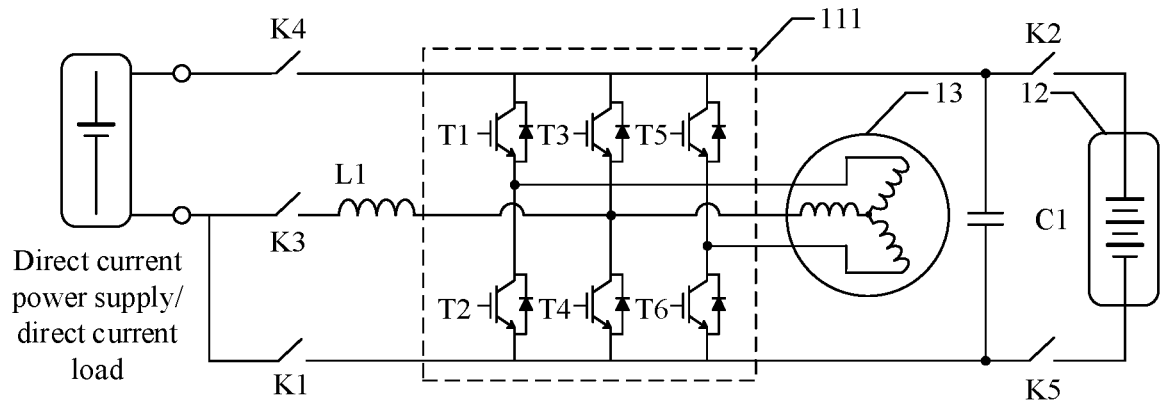
FIG. 7 is a schematic diagram of a charging system according to an embodiment of the application.

To be compatible with this scenario, as shown in FIG. 7, the charging system 11 provided in an embodiment of the application may include a switch K1. A first end of the switch K1 is connected to the second battery end, and a second end of the switch K1 is connected to the second power supply end. The MCU 111 may control on and off of the switch K1. The MCU 111 may turn on the switch K1 when the power supply voltage falls within the charging voltage range of the power battery 12, and turn off the switch K1 when the power supply voltage is beyond the charging voltage range of the power battery 12.

A scenario in which the power supply voltage falls within the charging voltage range of the power battery 12 may be a scenario in which the power supply voltage is equal to the minimum charging voltage of the power battery 12, may be a scenario in which the power supply voltage is equal to the maximum charging voltage of the power battery 12, or may be a scenario in which the power supply voltage is greater than the minimum charging voltage of the power battery 12 and is less than the maximum charging voltage of the power battery 12. A scenario in which the power supply voltage is beyond the charging voltage range of the power battery 12 may be a scenario in which the power supply voltage is less than the minimum charging voltage of the power battery 12, or may be a scenario in which the power supply voltage is greater than the maximum charging voltage of the power battery 12.

As shown in FIG. 7, when the power battery 12 is charged, the switch K5 is turned on by default. When the switch K1 is turned on, the power battery 12 can be directly connected to the direct current power supply, and therefore can directly receive the power supply voltage provided by the direct current power supply to complete charging. Therefore, the MCU 111 may turn on the switch K1 when the power supply voltage falls within the charging voltage range of the power battery 12.

When the switch K1 is turned off, the charging system 11 shown in FIG. 7 is equivalent to the charging system 11 shown in FIG. 3, and the MCU 111 may perform boost conversion on the power supply voltage. Details are not described again.

In an embodiment, as shown in FIG. 3, the charging system 11 may include a filter capacitor C1. One end of the filter capacitor C1 is connected to the first battery end, and the other end of the filter capacitor C1 is connected to the second battery end. When the power battery 12 is charged, the filter capacitor C1 may filter the first output voltage.

Similarly, as shown in FIG. 3, the charging system 11 may include a filter capacitor C2. One end of the filter capacitor C2 is connected to the first power supply end, and the other end of the filter capacitor C2 is connected to the second power supply end. When the power battery 12 is charged, the filter capacitor C2 may filter the received power supply voltage.

Embodiment 2

With development of charging and discharging technologies of the electric vehicle 10, increasingly more electric vehicles 10 can also support a discharging function, that is, the electric vehicle 10 provides power to a direct current load. In some scenarios, the direct current load may be another electric vehicle. For example, as shown in FIG. 3, the first power supply end of the charging system 11 may be connected to a positive electrode of the direct current load, and the second power supply end of the charging system 11 may be connected to a negative electrode of the direct current load.

The power battery 12 may output the battery voltage to the charging system 11. When the battery voltage of the power battery 12 is greater than a maximum working voltage of the direct current load, the charging system 11 may perform buck conversion on the battery voltage to obtain a second output voltage that is adapted to the direct current load, and output the second output voltage to the direct current load by using the first power supply end and the second power supply end. When the direct current load is another electric vehicle, a working voltage range of the direct current load may be understood as a charging voltage range of a power battery in the another electric vehicle.

A lower limit of the working voltage range of the direct current load is a minimum working voltage, and the minimum working voltage may be understood as a minimum working voltage value that can be adapted to the direct current load. An upper limit of the working voltage range of the direct current load is the maximum working voltage, and the maximum working voltage may be understood as a maximum working voltage value that can be adapted to the direct current load.

For example, if the battery voltage of the power battery 12 is 800 V and the working voltage range of the direct current load is 400 V to 600 V, the MCU 111 may perform buck conversion on the battery voltage to obtain the second output voltage falling within the working voltage range. The charging system 11 outputs the second output voltage to the direct current load to provide an adaptive working voltage to the direct current load.

Next, the bridge arm 2 including the switch transistor T3 and the switch transistor T4 in FIG. 3 is used as an example to illustrate a buck conversion process. It can be understood that in this case, the switches K2 to K5 are turned on, and details are not described again. When buck conversion is performed on the battery voltage, the following two stages are mainly included.

Stage 1: The inductor L1 is charged.

Figure 8:
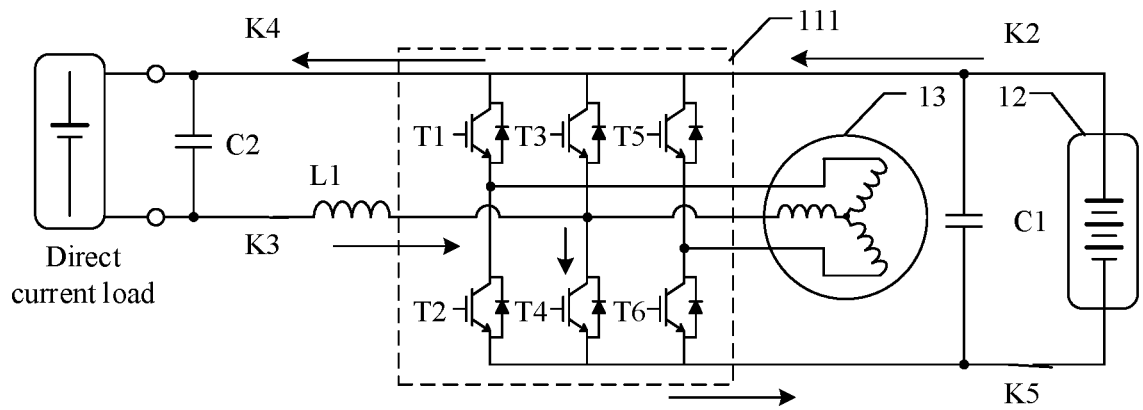
FIG. 8 shows a first buck conversion state of a charging system according to an embodiment of the application.

The MCU 111 turns on the switch transistor T4. In this case, the switch transistor T3 remains off. As shown in FIG. 8, current is output from the positive electrode of the power battery 12, and flows back to the negative electrode of the power battery 12 after being transmitted by the direct current load, the inductor L1, and the switch transistor T4. In this stage, the inductor L1 is charged. The second output voltage that is output by the charging system 11 is a difference obtained after a voltage of the inductor L1 is subtracted from the battery voltage. Apparently, the second output voltage is less than the battery voltage. Therefore, the charging system 11 can implement buck conversion on the battery voltage.

Stage 2: The inductor L1 discharges electricity.

Figure 9:
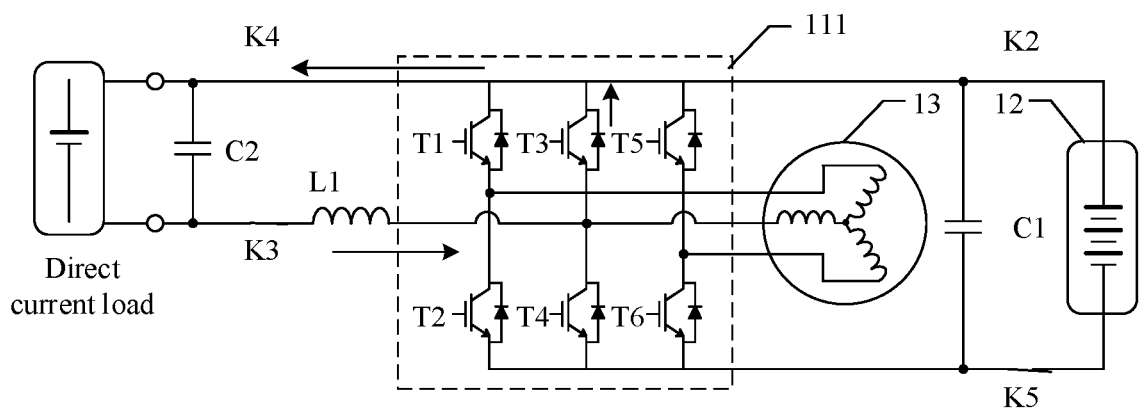
FIG. 9 shows a second buck conversion state of a charging system according to an embodiment of the application.

The MCU 111 may turn off the switch transistor T4, and the charging loop of the inductor L1 is turned off. The inductor L1 starts to discharge electricity due to a freewheeling feature of the inductor. As shown in FIG. 9, the current is output from an end that is of the inductor L1 and that is close to the switch transistor T3, and flows back to an end that is of the inductor L1 and that is close to the second power supply end after being transmitted by a diode in the switch transistor T3 and the direct current load. In this process, the second output voltage of the charging system 11 is the voltage of the inductor L1. Apparently, the voltage of the inductor L1 is less than the battery voltage. Therefore, the charging system 11 can implement buck conversion on the battery voltage.

It can be understood that in the charging system 11 shown in FIG. 6, the MCU 111 may also synchronously control a plurality of bridge arms to perform boost conversion. For example, the MCU 111 may synchronously control on and off of the switch transistor T2, the switch transistor T4, and the switch transistor T6, so that the inductor L1-1 to the inductor L1-3 are simultaneously charged and simultaneously discharge electricity. This case is equivalent to that the three inductors work in parallel to support voltage conversion in a high power scenario.

It should be noted that the charging system 11 shown in FIG. 7 is also applicable to buck conversion on the battery voltage. When the battery voltage falls within the working voltage range of the direct current load, the MCU 111 may turn on the switch K1, so that the power battery 12 directly provides power to the direct current load. When the battery voltage is beyond the working voltage range of the direct current load, the MCU 111 may turn off the switch K1, so that the MCU 111 can perform voltage conversion on the battery voltage. Details are not described again.

A scenario in which the battery voltage falls within the working voltage range of the direct current load may be a scenario in which the battery voltage is equal to the minimum working voltage of the direct current load, may be a scenario in which the battery voltage is equal to the maximum working voltage of the direct current load, or may be a scenario in which the battery voltage is greater than the minimum working voltage of the direct current load and is less than the maximum working voltage of the direct current load. A scenario in which the battery voltage is beyond the working voltage range of the direct current load may be a scenario in which the battery voltage is less than the minimum working voltage of the direct current load, or may be a scenario in which the battery voltage is greater than the maximum working voltage of the direct current load.

Embodiment 3

As mentioned above, not only a low-voltage charging pile but also a high-voltage charging pile exists in the market. Not only a high-voltage power battery but also a low-voltage power battery may be configured in the electric vehicle 10. Therefore, it is also a common scenario in which a high-voltage charging pile charges a low-voltage power battery.

In view of this, an embodiment of the application provides a charging system 11. A connection relationship between the charging system 11 and each of a direct current power supply and the power battery 12 is the same as that in the foregoing embodiment. Details are not described again. When a power supply voltage of the direct current power supply is greater than the maximum charging voltage of the power battery 12, the charging system 11 may perform buck conversion on the power supply voltage. When the power supply voltage of the direct current power supply is less than the minimum charging voltage of the power battery 12, the charging system 11 may perform boost conversion on the power supply voltage. Therefore, the charging system 11 can provide the power battery 12 with a first output voltage adapted to the power battery 12.

Figure 10:
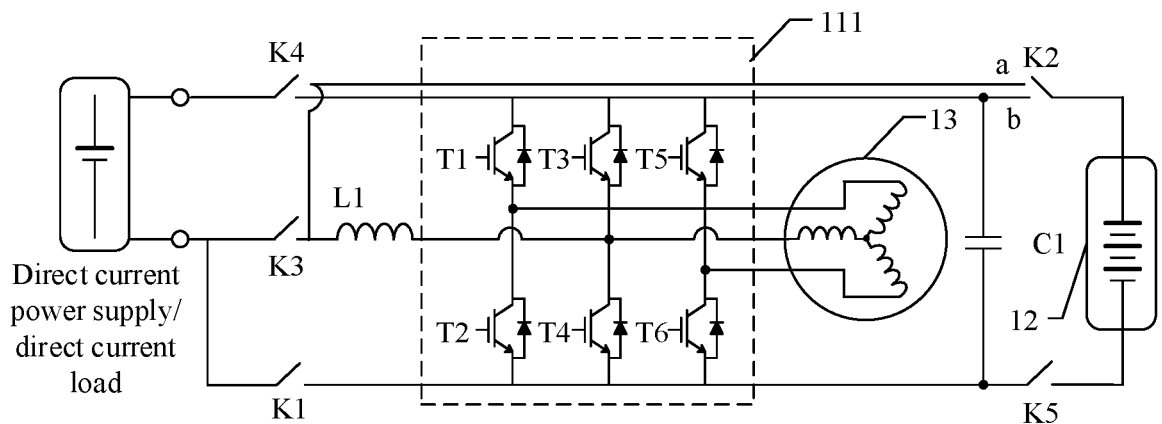
FIG. 10 is a schematic diagram of a charging system according to an embodiment of the application.

For example, as shown in FIG. 10, the charging system 11 in an embodiment of the application may include an MCU 111 and an inductor L1. A connection relationship between the inductor L1 and the N bridge arms in the MCU 111 is not described again. In addition, the charging system 11 may include a switch K1 and a switch K2. A first end of the switch K1 is connected to a second battery end of the charging system 11, and a second end of the switch K1 is connected to a second power supply end. The switch K2 is a single-pole double-throw switch. A first end of the switch K2 is connected to a first battery end, a second end a of the switch K2 is connected to one end of the inductor L1, and a third end b of the switch K2 is connected to a first power supply end.

It should be noted that the switch K2 and the power battery 12 may be independently disposed. In this case, the first end of the switch K2 may be understood as the first battery end of the charging system 11. It can be understood that the switch K2 and the power battery 12 may be integrated into a power battery pack. In this case, it can be considered that the charging system 11 provided in an embodiment of the application includes two first battery ends, where one first battery end is connected to the second end a of the switch K2, and the other first battery end is connected to the third end b of the switch K2.

Next, buck conversion and boost conversion on the power supply voltage are separately described by using FIG. 10 as an example.

I. Buck Conversion

Figure 11:
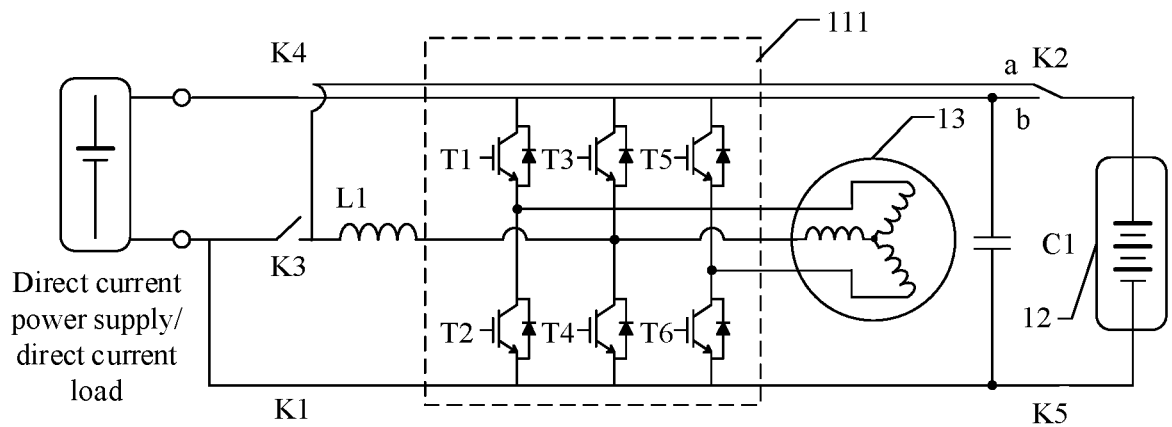
FIG. 11 shows a first switch state of a charging system according to an embodiment of the application.

In a buck conversion process, the MCU 111 may turn on the switch K1, and turn on the first end and the second end a of the switch K2. A circuit state may be shown in FIG. 11. It should be noted that in some scenarios, a switch K3 to a switch K5 may be disposed in the charging system 11. In this case, the switch K4 and the switch K5 should remain on, and the switch K3 should remain off. Based on the circuit state shown in FIG. 11 and using a bridge arm 2 including a switch transistor T3 and a switch transistor T4 as an example, the buck conversion process mainly includes the following two stages.

Stage 1: The inductor L1 is charged.

Figure 12:
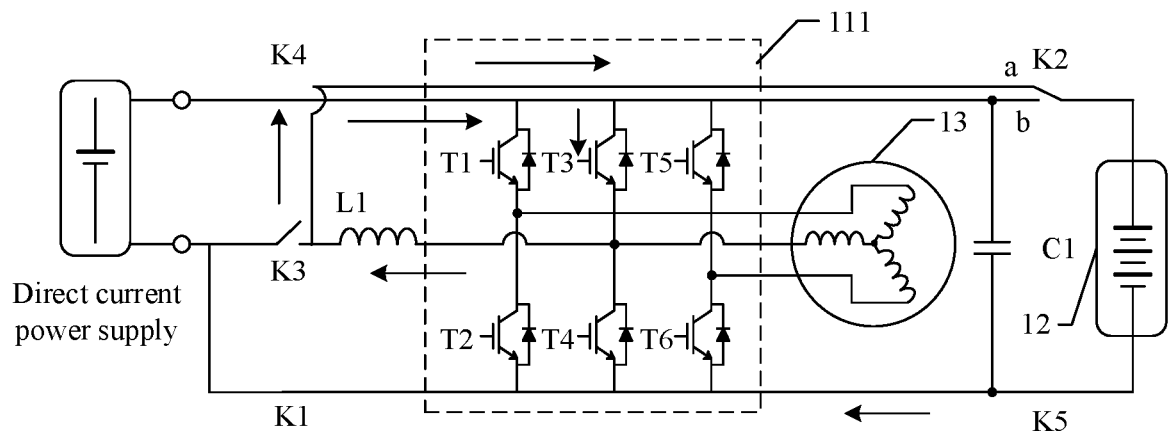
FIG. 12 shows a third buck conversion state of a charging system according to an embodiment of the application.

The MCU 111 turns on the switch transistor T3, so that the inductor L1 is charged. As shown in FIG. 12, current is output from a positive electrode of the direct current power supply, and flows back to a negative electrode of the direct current power supply after being transmitted by the switch transistor T3, the inductor L1, the switch K2, and the power battery 12, so as to form a charging loop to charge the inductor L1. In this process, the first output voltage of the charging system 11 is a difference obtained after a voltage of the inductor L1 is subtracted from the power supply voltage. Apparently, the first output voltage is less than the power supply voltage. Therefore, the charging system 11 can implement buck conversion.

Stage 2: The inductor L1 discharges electricity.

Figure 13:
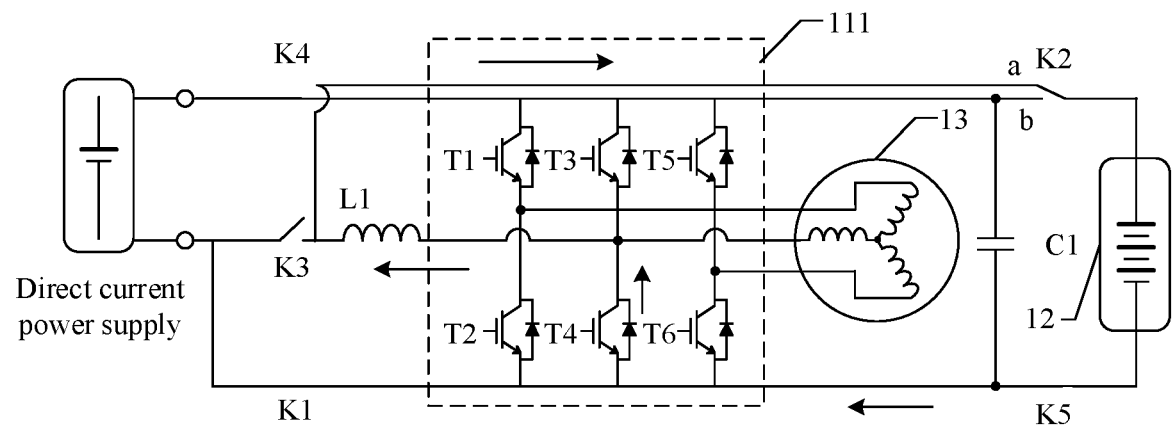
FIG. 13 shows a fourth buck conversion state of a charging system according to an embodiment of this application.

The MCU 111 turns off the switch transistor T3, so that the inductor L1 discharges electricity. After the MCU 111 turns off the switch transistor T3, the charging loop is turned off. The inductor L1 discharges electricity due to a freewheeling feature of the inductor. As shown in FIG. 13, the current is output from an end that is of the inductor L1 and that is close to the second power supply end, and flows back to an end that is of the inductor L1 and that is close to the switch transistor T4 after being transmitted by the switch K2, the power battery 12, and a diode in the switch transistor T4. In this process, the first output voltage of the charging system 11 is the voltage of the inductor L1. Apparently, the first output voltage is less than the power supply voltage.

Therefore, the charging system 11 can implement buck conversion on the power supply voltage.

II. Boost Conversion

Figure 14:
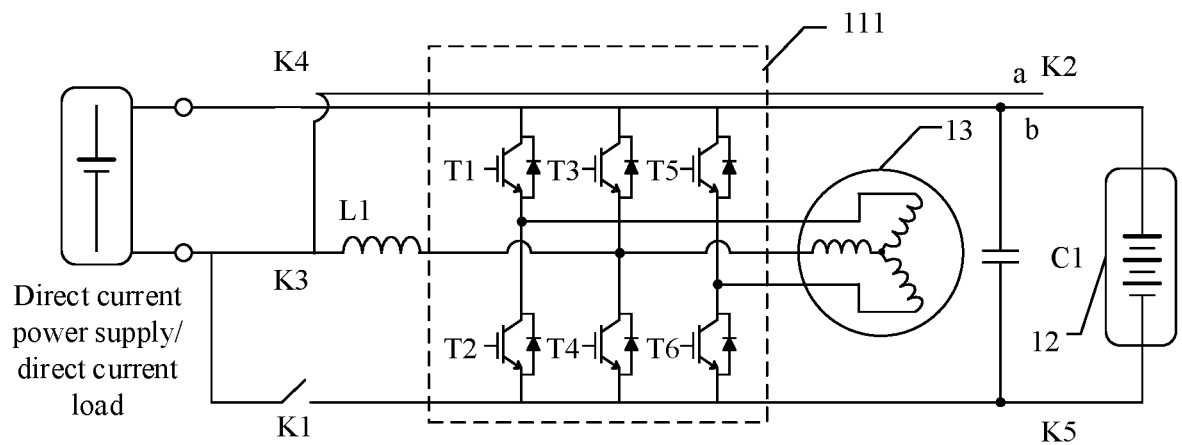
FIG. 14 shows a second switch state of a charging system according to an embodiment of the application.

As shown in FIG. 10, the charging system 11 may include a switch K3. A first end of the switch K3 is connected to a point connecting motor windings N1 to N3, and a second end of the switch K3 is connected to the second power supply end. In a boost conversion process, the MCU 111 may turn on the first end and the third end b of the switch K2, turn on the switch K3, and turn off the switch K1. A circuit state may be shown in FIG. 14. It can be learned from FIG. 14 that the circuit state in this case is equivalent to the charging system 11 shown in FIG. 3. Therefore, reference may be made to the boost conversion process provided in Embodiment 1. Details are not described again.

In addition, the charging system 11 shown in FIG. 10 may support voltage conversion in a buck-boost mode on the power supply voltage.

III. Buck-Boost

Figure 15:
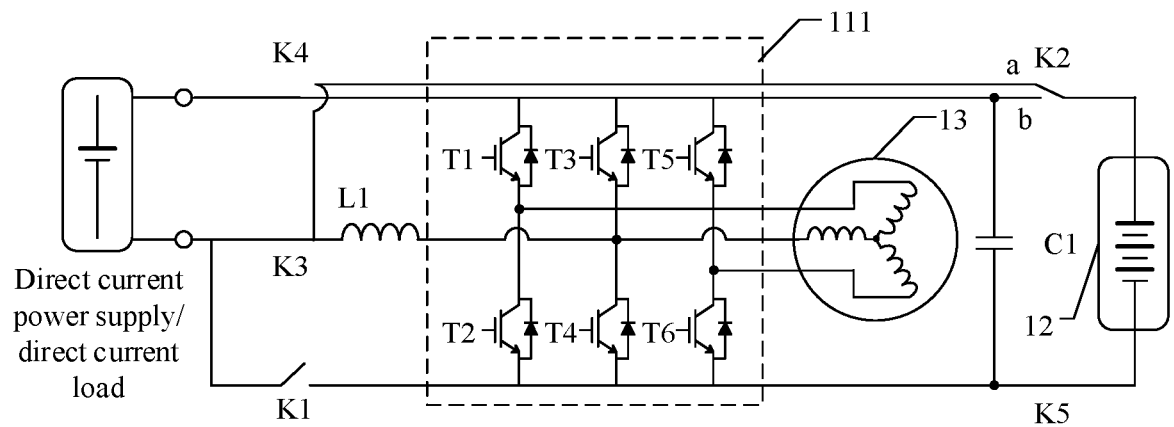
FIG. 15 shows a third switch state of a charging system according to an embodiment of the application.

When buck-boost conversion is performed on the power supply voltage, the MCU 111 may turn on the first end and the second end a of the switch K2, and turn on the switch K3. A circuit state may be shown in FIG. 15. Based on the circuit state shown in FIG. 15, the buck-boost conversion mainly includes the following two stages.

Stage 1: The inductor L1 is charged.

Figure 16:
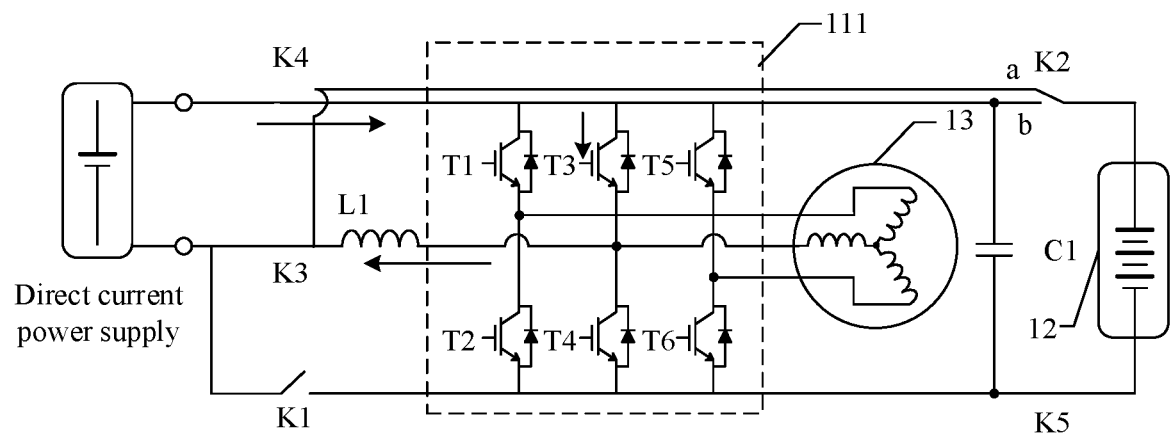
FIG. 16 shows a first buck-boost conversion state of a charging system according to an embodiment of the application.

The MCU 111 turns on the switch transistor T3, so that the inductor L1 is charged. As shown in FIG. 16, current is output from a positive electrode of the direct current power supply, and flows back to a negative electrode of the direct current power supply after being transmitted by the switch transistor T3 and the inductor L1, so as to form a charging loop of the inductor L1 to charge the inductor L1.

Stage 2: The inductor L1 discharges electricity.

Figure 17:
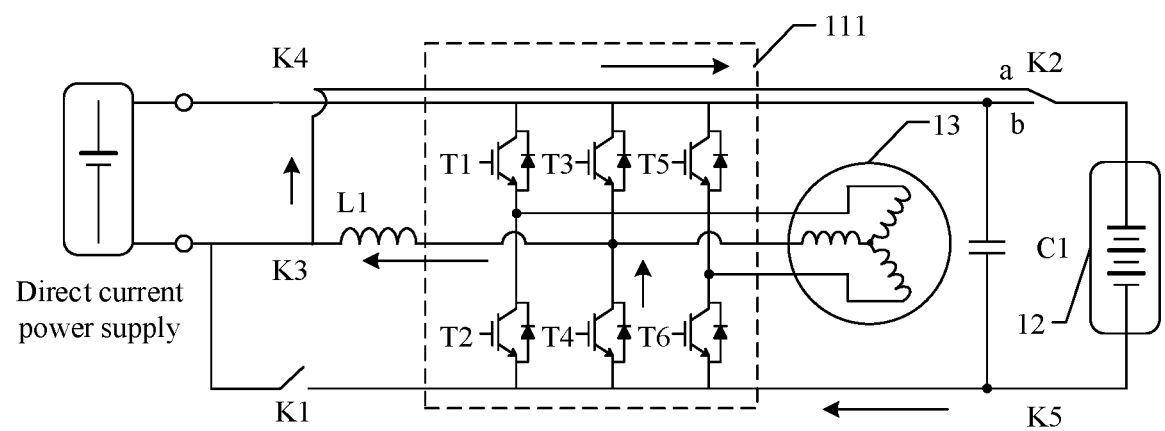
FIG. 17 shows a second buck-boost conversion state of a charging system according to an embodiment of the application.

The MCU 111 turns off the switch transistor T3, so that the inductor L1 discharges electricity. As shown in FIG. 17, the current is output from an end that is of the inductor L1 and that is close to the second power supply end, and flows back to an end that is of the inductor L1 and that is close to the switch transistor T4 after being transmitted by the switch K2, the power battery 12, and a diode in the switch transistor T4. It can be learned that the first output voltage of the charging system 11 is equal to the voltage of the inductor L1. The MCU 111 can control the voltage of the inductor L1 by controlling charging time of the inductor L1 in stage 1, so as to control the first output voltage. The first output voltage may be greater than the power supply voltage, or may be less than the power supply voltage.

Similar to Embodiment 1, when the power supply voltage of the direct current power supply falls within the charging voltage range of the power battery 12, the MCU 111 may turn on the first end and the third end b of the switch K2, and turn on the switch K1, so that the power battery 12 can directly receive the power supply voltage to complete charging. For implementation, refer to Embodiment 1. Details are not described again.

Embodiment 4

It should be noted that the charging system 11 shown in FIG. 10 may also support a discharging function of the electric vehicle 10. When the electric vehicle 10 discharges electricity, a connection relationship between the charging system 11 and each of the power battery 12 and a direct current load is similar to that in Embodiment 2. Details are not described again.

Different from Embodiment 2, the charging system 11 provided in FIG. 10 not only can perform buck conversion on a battery voltage, but also can perform boost conversion on the battery voltage, so that both a battery voltage that is output by a high-voltage power battery and a battery voltage that is output by a low-voltage power battery can be adapted to the direct current load in different working voltage ranges.

Next, boost conversion and buck conversion on the battery voltage are separately described by using FIG. 10 as an example.

I. Boost Conversion

In a boost conversion process, the MCU 111 may turn on the switch K1, and turn on the first end and the second end a of the switch K2. A circuit state may be shown in FIG. 11. Based on the circuit state shown in FIG. 11 and using a bridge arm 2 including a switch transistor T3 and a switch transistor T4 as an example, the boost conversion process mainly includes the following two stages.

Stage 1: The inductor L1 is charged.

Figure 18:
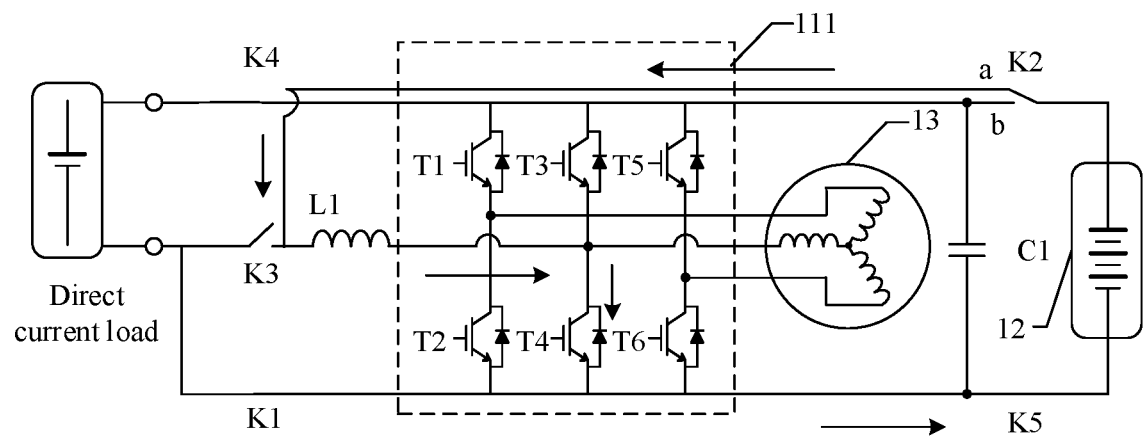
FIG. 18 shows a third boost conversion state of a charging system according to an embodiment of the application.

The MCU 111 turns on the switch transistor T4, so that the inductor L1 is charged. As shown in FIG. 18, current is output from a positive electrode of the power battery 12, and flows back to a negative electrode of the power battery 12 after being transmitted by the switch K2, the inductor L1, and the switch transistor T4, so as to form a charging loop to charge the inductor L1.

Stage 2: The inductor L1 discharges electricity.

Figure 19:
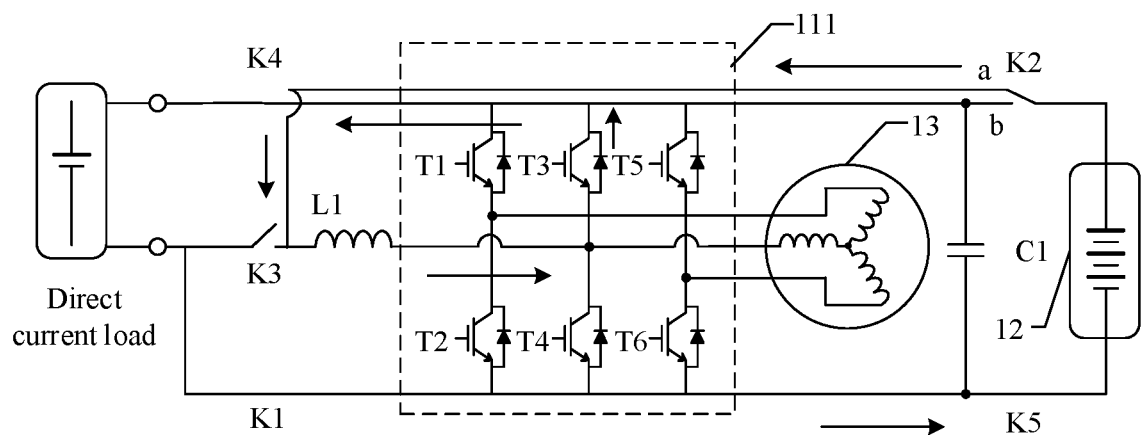
FIG. 19 shows a fourth boost conversion state of a charging system according to an embodiment of the application.

The MCU 111 turns off the switch transistor T4, so that the inductor L1 discharges electricity. After the MCU 111 turns off the switch transistor T4, the charging loop is turned off. The inductor L1 discharges electricity due to a freewheeling feature of the inductor. As shown in FIG. 19, the current is output from the positive electrode of the power battery 12, and flows back to the negative electrode of the power battery 12 after being transmitted by the switch K2, the inductor L1, a diode in the switch transistor T3, and the direct current load. In this process, a second output voltage of the charging system 11 is the sum of the battery voltage of the power battery 12 and the voltage of the inductor L1. Apparently, the second output voltage is greater than the battery voltage. Therefore, the charging system 11 can implement boost conversion on the battery voltage.

II. Buck Conversion

As shown in FIG. 10, the charging system 11 may include a switch K3. A first end of the switch K3 is connected to a point connecting motor windings N1 to N3, and a second end of the switch K3 is connected to the second power supply end. In a buck conversion process, the MCU 111 may turn on the first end and the third end b of the switch K2, turn on the switch K3, and turn off the switch K1. A circuit state may be shown in FIG. 14. It can be learned from FIG. 14 that the circuit state in this case is equivalent to the charging system 11 shown in FIG. 3. Therefore, reference may be made to the buck conversion process provided in Embodiment 2. Details are not described again.

In addition, the charging system 11 shown in FIG. 10 may support voltage conversion in a buck-boost mode on the battery voltage.

III. Buck-Boost

When buck-boost conversion is performed on the battery voltage, the MCU 111 may turn on the first end and the second end a of the switch K2, and turn on the switch K3. A circuit state may be shown in FIG. 15. Based on the circuit state shown in FIG. 15, the buck-boost conversion mainly includes the following two stages.

Stage 1: The inductor L1 is charged.

Figure 20:
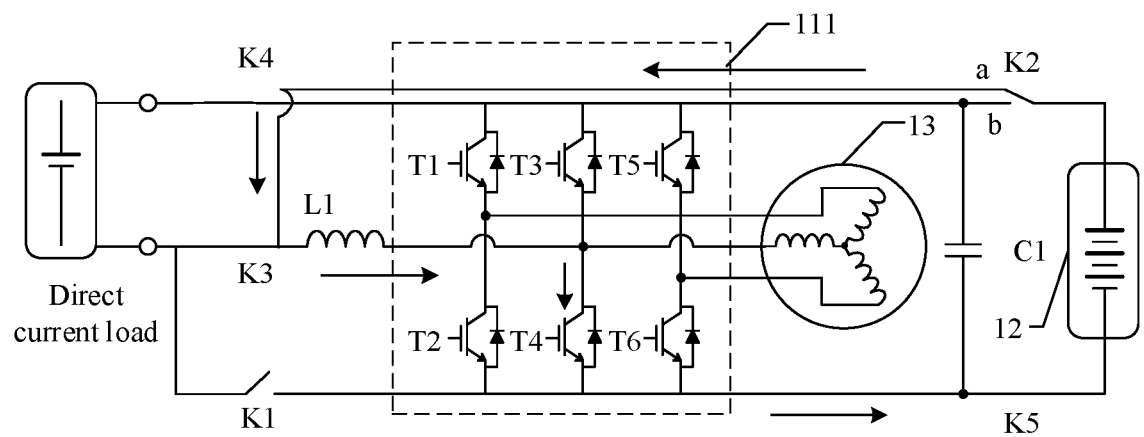
FIG. 20 shows a third buck-boost conversion state of a charging system according to an embodiment of the application.

The MCU 111 turns on the switch transistor T4, so that the inductor L1 is charged. As shown in FIG. 20, current is output from a positive electrode of the power battery 12, and flows back to a negative electrode of the power battery 12 after being transmitted by the switch K2, the inductor L1, and the switch transistor T4, so as to form a charging loop of the inductor L1.

Stage 2: The inductor L1 discharges electricity.

Figure 21:
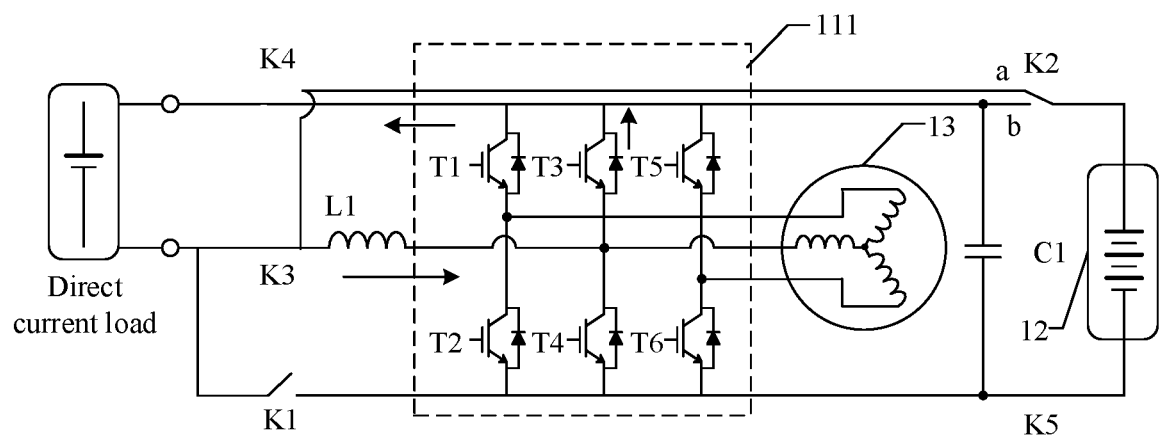
FIG. 21 shows a fourth buck-boost conversion state of a charging system according to an embodiment of the application.

The MCU 111 turns off the switch transistor T4, so that the inductor L1 discharges electricity. As shown in FIG. 21, the current is output from an end that is of the inductor L1 and that is close to the switch transistor T3, and flows back to an end that is of the inductor L1 and that is close to the second power supply end after being transmitted by a diode in the switch transistor T3 and the direct current load. It can be learned that the second output voltage of the charging system 11 is equal to the voltage of the inductor L1. The MCU 111 can control the voltage of the inductor L1 by controlling charging time of the inductor L1 in stage 1, so as to control the second output voltage. The second output voltage may be greater than the battery voltage, or may be less than the battery voltage.

Similar to Embodiment 2, when the battery voltage of the power battery 12 falls within the working voltage range of the direct current load, the MCU 111 may turn on the first end and the third end b of the switch K2, and turn on the switch K1, so that the power battery 12 can directly provide power to the direct current load. For implementation, refer to Embodiment 2. Details are not described again.

Embodiment 5

In Embodiment 3 and Embodiment 4, the inductor L1 is connected to the second power supply end. Based on a similar concept, the inductor L1 may also be connected to the first power supply end. In this case, the charging system 11 may be shown in FIG. 22.

The charging system 11 includes a switch K5 and a switch K6. The switch K5 is a single-pole double-throw switch, a first end of the switch K5 is connected to the second battery end, a second end a of the switch K5 is connected to low-potential ends of the N bridge arms, a third end b of the switch K5 is connected to one end of the inductor L1, a second end of the switch K6 is connected to the second power supply end, a first end of the switch K6 is connected to the first battery end, and the second end of the switch K6 is connected to the first power supply end.

It should be noted that the switch K5 and the power battery 12 may be independently disposed. In this case, the first end of the switch K5 may be understood as the second battery end of the charging system 11. It can be understood that the switch K5 and the power battery 12 may be integrated into a power battery pack. In this case, it can be considered that the charging system 11 provided in an embodiment of the application includes two second battery ends, where one second battery end is connected to the second end a of the switch K5, and the other second battery end is connected to the third end b of the switch K5.

Figure 22:
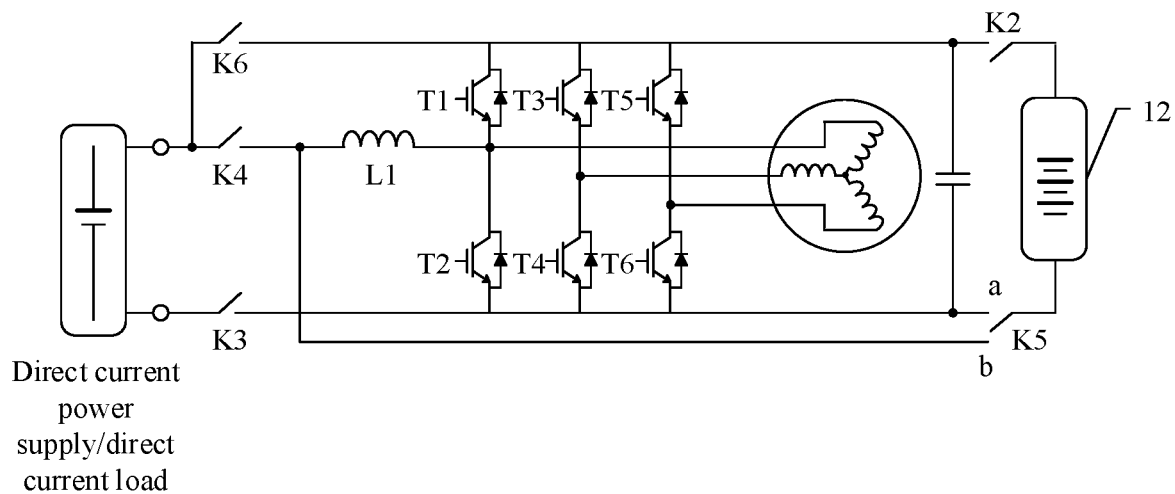
FIG. 22 is a schematic diagram of another charging system according to an embodiment of this application.

Next, buck conversion and boost conversion on the power supply voltage are separately described by using FIG. 22 as an example.

I. Buck Conversion

Figure 23:
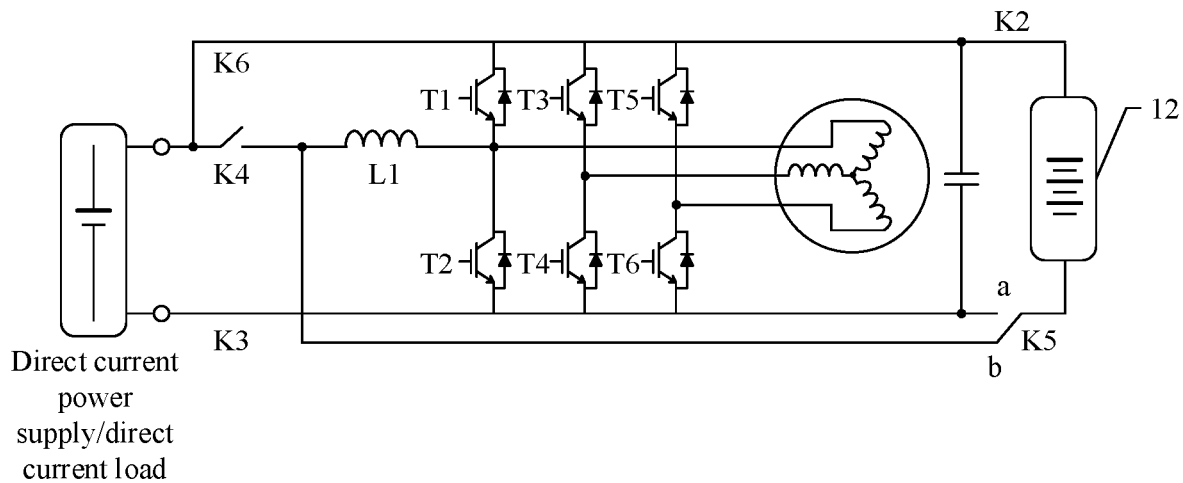
FIG. 23 shows a fourth switch state of a charging system according to an embodiment of the application.

When the power supply voltage is greater than the maximum charging voltage, the MCU 111 may perform buck conversion on the power supply voltage. In a buck conversion process, the MCU 111 may turn on the switch K6, and turn on the first end and the third end b of the switch K5. A circuit state may be shown in FIG. 23. It should be noted that in some scenarios, a switch K2 to a switch K4 may be disposed in the charging system 11. In this case, the switch K2 and the switch K3 should remain on, and the switch K4 should remain off. Based on the circuit state shown in FIG. 23 and using a bridge arm 2 including a switch transistor T3 and a switch transistor T4 as an example, the buck conversion process mainly includes the following two stages.

Stage 1: The inductor L1 is charged.

Figure 24:
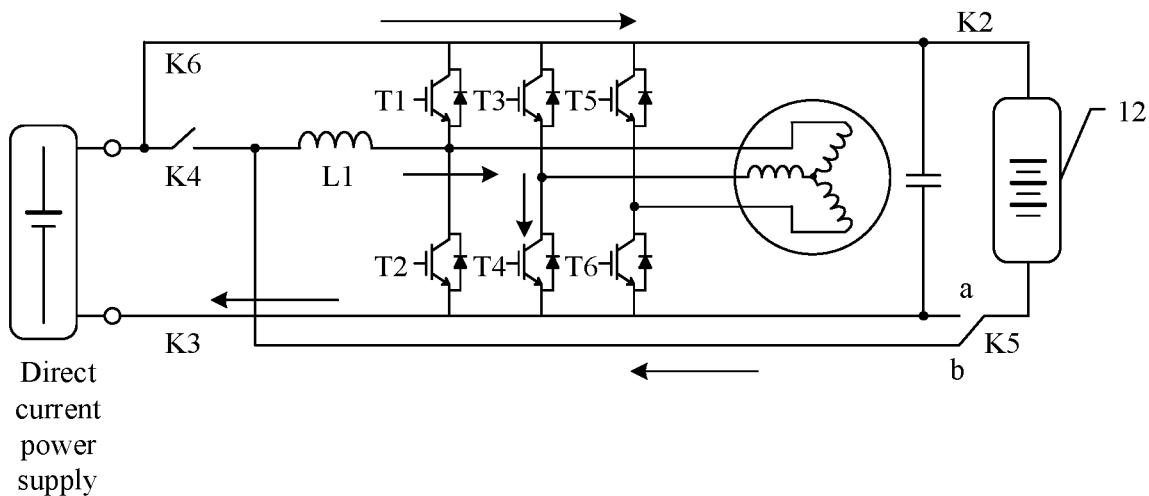
FIG. 24 shows a fifth buck conversion state of a charging system according to an embodiment of the application.

The MCU 111 turns on the switch transistor T4, so that the inductor L1 is charged. As shown in FIG. 24, current is output from a positive electrode of the direct current power supply, and flows back to a negative electrode of the direct current power supply after being transmitted by the power battery 12, the switch K5, the inductor L1, and the switch transistor T4, so as to form a charging loop to charge the inductor L1. In this process, the first output voltage of the charging system 11 is a difference obtained after a voltage of the inductor L1 is subtracted from the power supply voltage. Apparently, the first output voltage is less than the power supply voltage. Therefore, the charging system 11 can implement buck conversion.

Stage 2: The inductor L1 discharges electricity.

Figure 25:
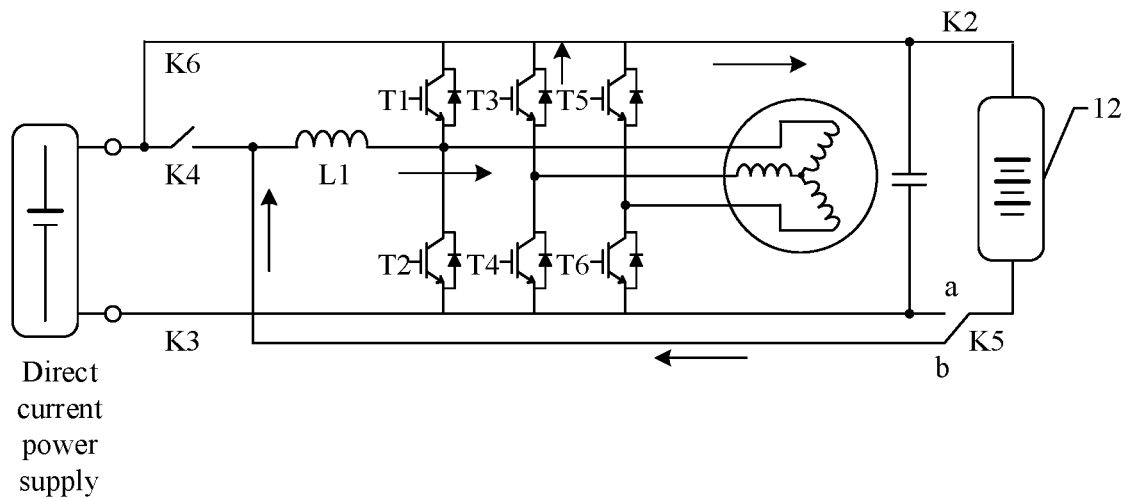
FIG. 25 shows a sixth buck conversion state of a charging system according to an embodiment of the application.

The MCU 111 turns off the switch transistor T4, so that the inductor L1 discharges electricity; and turns off a second switch transistor, so that the inductor L1 discharges electricity. After the MCU 111 turns off the switch transistor T4, the charging loop is turned off. The inductor L1 discharges electricity due to a freewheeling feature of the inductor. As shown in FIG. 25, the current is output from an end that is of the inductor L1 and that is close to the switch transistor T3, and flows back to an end that is of the inductor L1 and that is close to the first power supply end after being transmitted by a diode in the switch transistor T3, the power battery 12, and the switch K5. In this process, the first output voltage of the charging system 11 is the voltage of the inductor L1. Apparently, the first output voltage is less than the power supply voltage. Therefore, the charging system 11 can implement buck conversion on the power supply voltage.

II. Boost Conversion

Figure 26:
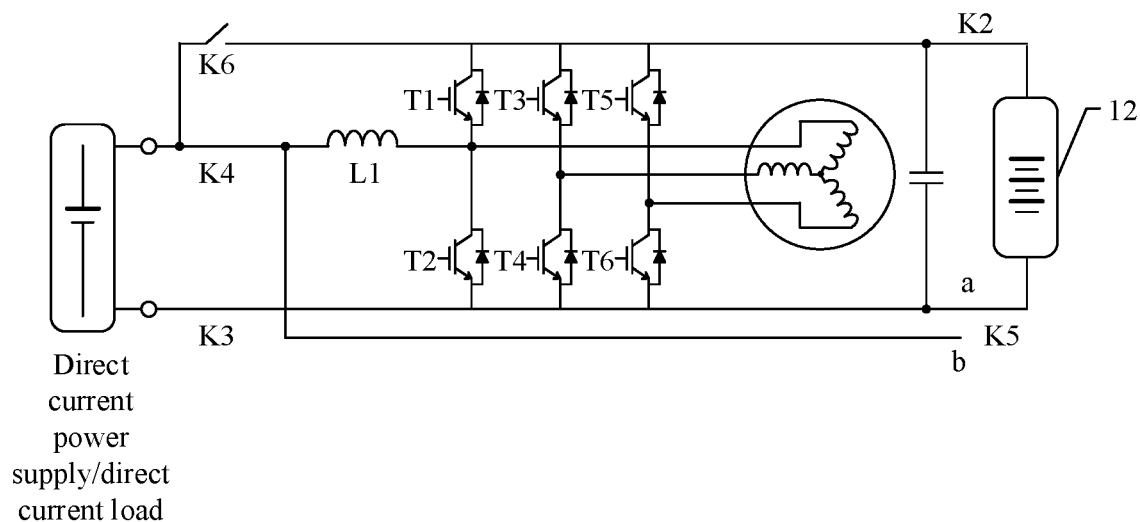
FIG. 26 shows a fifth switch state of a charging system according to an embodiment of the application.

As shown in FIG. 22, the charging system 11 may include a switch K4. A first end of the switch K4 is connected to a point connecting the N motor windings, and a second end of the switch K4 is connected to the first power supply end. In a boost conversion process, the MCU 111 may turn on the first end and the second end of the switch K5, turn on the switch K4, and turn off the switch K6. A circuit state may be shown in FIG. 26. It can be learned from FIG. 26 that the circuit state in this case is equivalent to the charging system 11 shown in FIG. 3. Therefore, reference may be made to the boost conversion process provided in Embodiment 1. Details are not described again.

In addition, the charging system 11 shown in FIG. 22 may support voltage conversion in a buck-boost mode on the power supply voltage.

III. Buck-Boost

Figure 27:
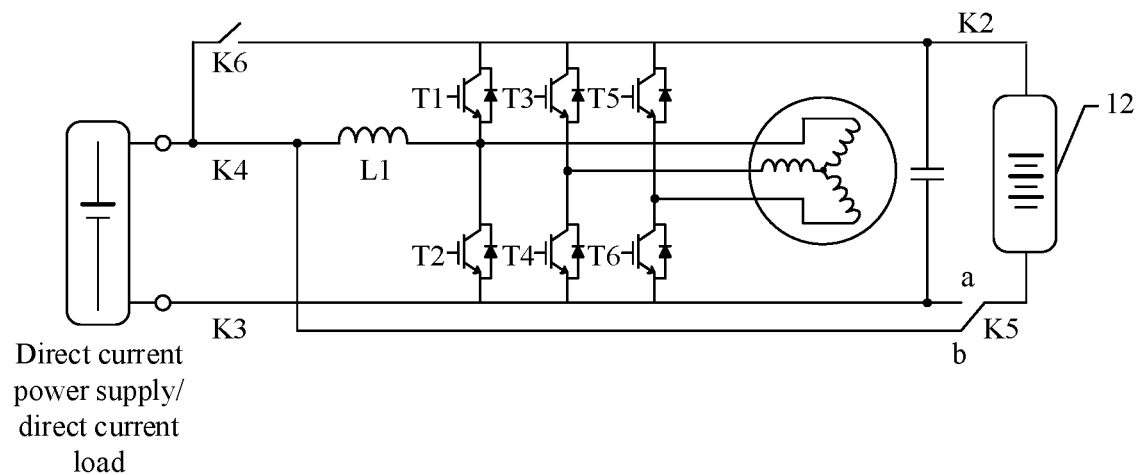
FIG. 27 shows a sixth switch state of a charging system according to an embodiment of the application.

When buck-boost conversion is performed on the power supply voltage, the MCU 111 may turn on the first end and the third end b of the switch K5, and turn on the switch K4. A circuit state may be shown in FIG. 27. Based on the circuit state shown in FIG. 27, the buck-boost conversion mainly includes the following two stages.

Stage 1: The inductor L1 is charged.

Figure 28:
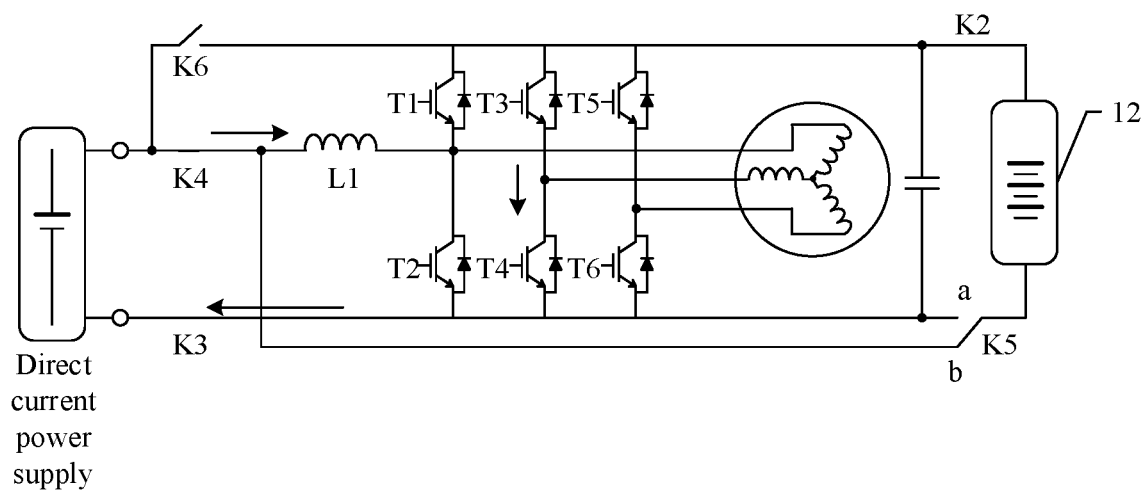
FIG. 28 shows a fifth buck-boost conversion state of a charging system according to an embodiment of the application.

The MCU 111 turns on the switch transistor T4, so that the inductor L1 is charged. As shown in FIG. 28, current is output from a positive electrode of the direct current power supply, and flows back to a negative electrode of the direct current power supply after being transmitted by the inductor L1 and the switch transistor T4, so as to form a charging loop of the inductor L1.

Stage 2: The inductor L1 discharges electricity.

Figure 29:
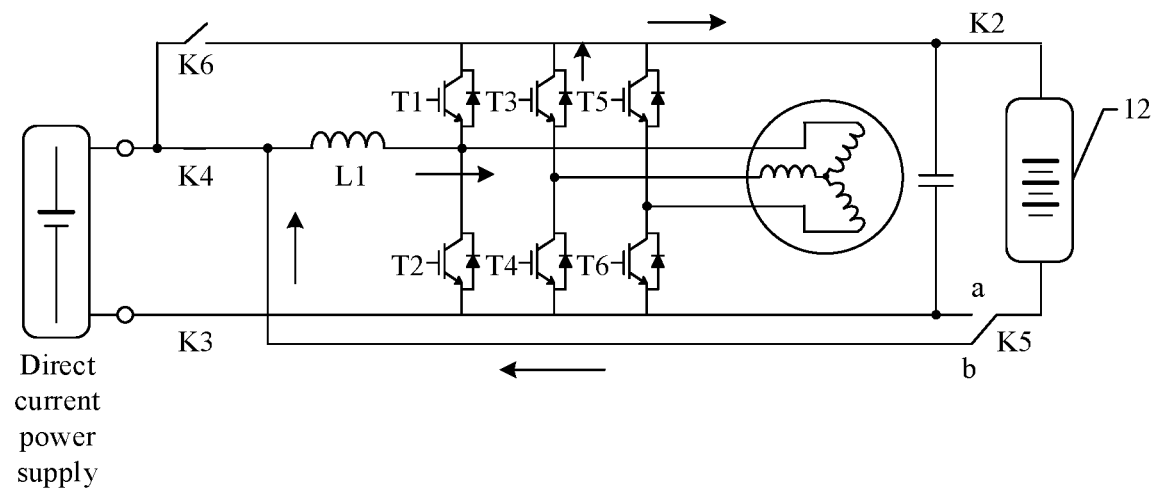
FIG. 29 shows a sixth buck-boost conversion state of a charging system according to an embodiment of the application.

The MCU 111 turns off the switch transistor T3, so that the inductor L1 discharges electricity. As shown in FIG. 29, the current is output from an end that is of the inductor L1 and that is close to the switch transistor T3, and flows back to an end that is of the inductor L1 and that is close to the first power supply end after being transmitted by a diode in the switch transistor T3, the power battery 12, and the switch K5. It can be learned that the first output voltage of the charging system 11 is equal to the voltage of the inductor L1. The MCU 111 can control the voltage of the inductor L1 by controlling charging time of the inductor L1 in stage 1, so as to control the first output voltage. The first output voltage may be greater than the power supply voltage, or may be less than the power supply voltage.

Similar to Embodiment 1, when the power supply voltage of the direct current power supply falls within the charging voltage range of the power battery 12, the MCU 111 may turn on the first end and the second end a of the switch K5, and turn on the switch K6, so that the power battery 12 can directly receive the power supply voltage to complete charging. For implementation, refer to Embodiment 1. Details are not described again.

Embodiment 6

It should be noted that the charging system 11 shown in FIG. 22 also not only can perform buck conversion on a battery voltage, but also can perform boost conversion on the battery voltage, so that both a battery voltage that is output by a high-voltage power battery and a battery voltage that is output by a low-voltage power battery can be adapted to the direct current load in different working voltage ranges.

Next, boost conversion and buck conversion on the battery voltage are separately described by using FIG. 22 as an example.

I. Boost Conversion

In a boost conversion process, the MCU 111 may turn on the switch K6, and turn on the first end and the third end b of the switch K5. A circuit state may be shown in FIG. 23. Based on the circuit state shown in FIG. 23 and using a bridge arm 2 including a switch transistor T3 and a switch transistor T4 as an example, the boost conversion process mainly includes the following two stages.

Stage 1: The inductor L1 is charged.

Figure 30:
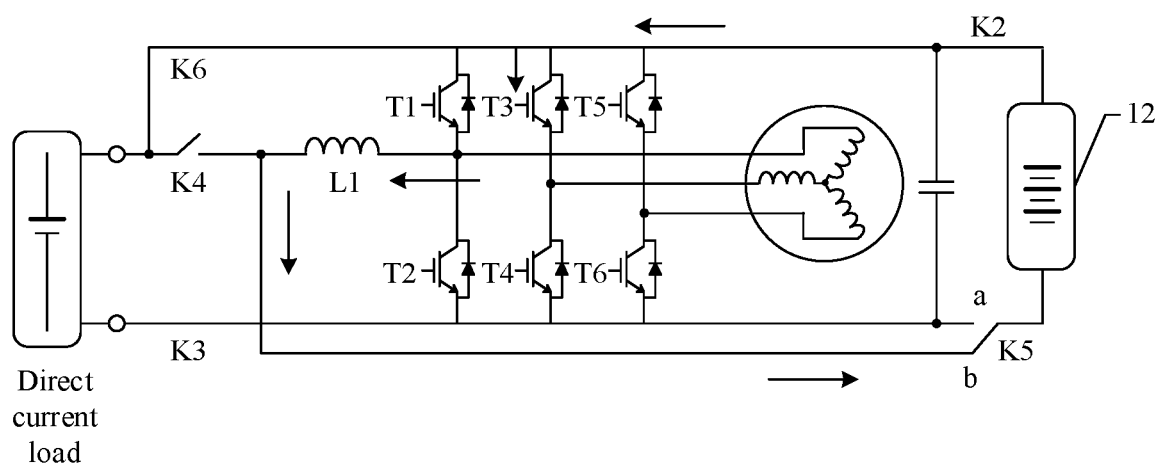
FIG. 30 shows a fifth boost conversion state of a charging system according to an embodiment of the application.
Figure 31:
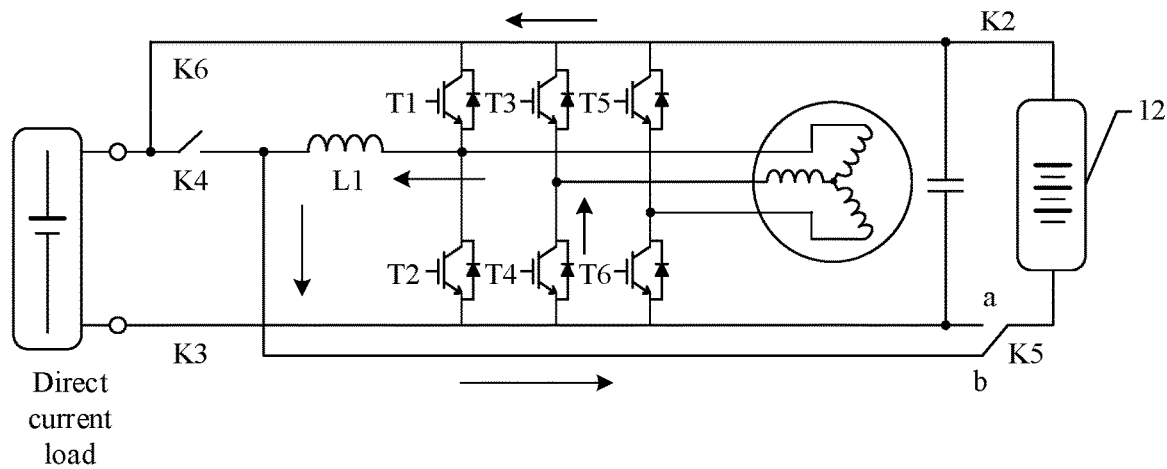
FIG. 31 shows a sixth boost conversion state of a charging system according to an embodiment of the application.

The MCU 111 turns on the switch transistor T3, so that the inductor L1 is charged. As shown in FIG. 30, current is output from a positive electrode of the power battery 12, and flows back to a negative electrode of the power battery 12 after being transmitted by the switch transistor T3, the inductor L1, and the switch K5, so as to form a charging loop to charge the inductor L1.

Stage 2: The inductor L1 discharges electricity.

Figure 32:
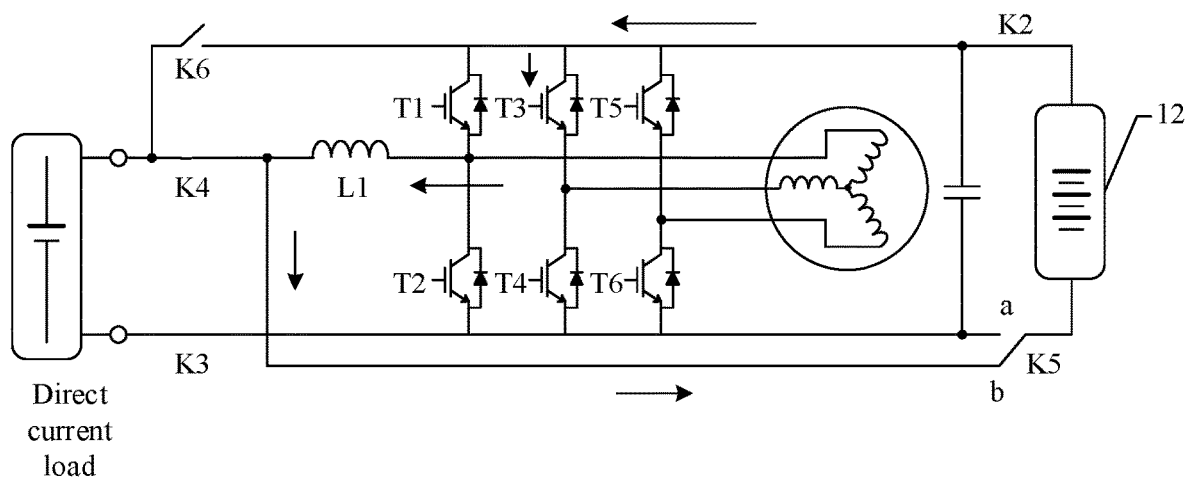
FIG. 32 shows a seventh buck-boost conversion state of a charging system according to an embodiment of the application.

The MCU 111 turns off the switch transistor T3, so that the inductor L1 discharges electricity. After the MCU 111 turns off the switch transistor T3, the charging loop is turned off. The inductor L1 discharges electricity due to a freewheeling feature of the inductor. As shown in FIG. 32, the current is output from the positive electrode of the power battery 12, and flows back to the negative electrode of the power battery 12 after being transmitted by the direct current load, a diode in the switch transistor T4, the inductor L1, and the switch transistor T5. In this process, a second output voltage of the charging system 11 is the sum of the battery voltage of the power battery 12 and the voltage of the inductor L1. Apparently, the second output voltage is greater than the battery voltage. Therefore, the charging system 11 can implement boost conversion on the battery voltage.

II. Buck Conversion

As shown in FIG. 22, the charging system 11 may include a switch K4. A first end of the switch K4 is connected to a point connecting the N motor windings, and a second end of the switch K4 is connected to the first power supply end. In a buck conversion process, the MCU 111 may turn on the first end and the second end a of the switch K5, turn on the switch K4, and turn off the switch K6. A circuit state may be shown in FIG. 26. It can be learned from FIG. 26 that the circuit state in this case is equivalent to the charging system 11 shown in FIG. 3. Therefore, reference may be made to the buck conversion process provided in Embodiment 2. Details are not described again.

In addition, the charging system 11 shown in FIG. 22 may also support voltage conversion in a buck-boost mode on the battery voltage.

III. Buck-Boost

When buck-boost conversion is performed on the battery voltage, the MCU 111 may turn on the first end and the third end b of the switch K5, and turn on the switch K4. A circuit state may be shown in FIG. 27. Based on the circuit state shown in FIG. 27, the buck-boost conversion mainly includes the following two stages.

Stage 1: The inductor L1 is charged.

The MCU 111 turns on the switch transistor T3, so that the inductor L1 is charged. As shown in FIG. 32, current is output from a positive electrode of the power battery 12, and flows back to a negative electrode of the power battery 12 after being transmitted by the switch transistor T3, the inductor L1, and the switch K5, so as to form a charging loop of the inductor L1.

Stage 2: The inductor L1 discharges electricity.

Figure 33:
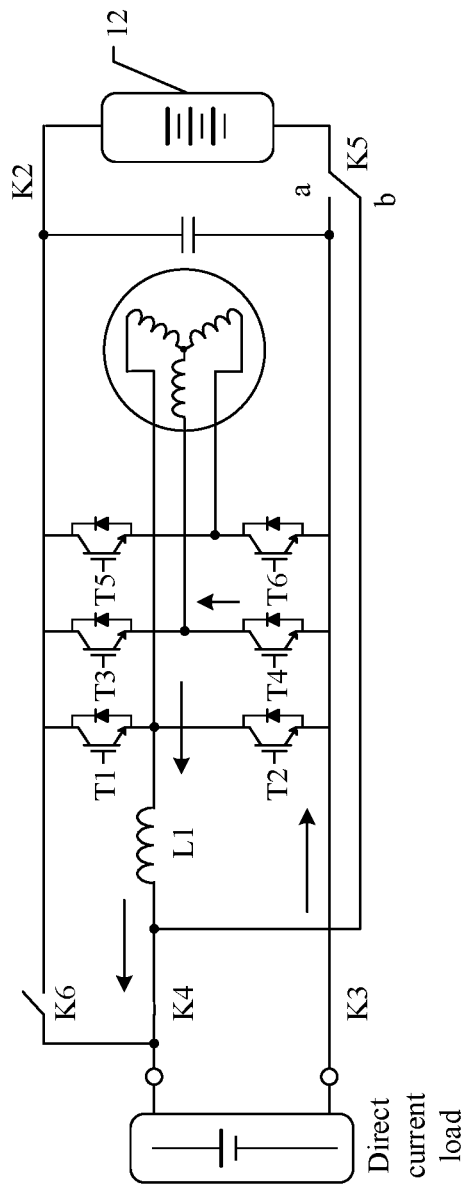
FIG. 33 shows an eighth buck-boost conversion state of a charging system according to an embodiment of the application.

The MCU 111 turns off the switch transistor T3, so that the inductor L1 discharges electricity. As shown in FIG. 33, the current is output from an end that is of the inductor L1 and that is close to the first power supply end, and flows back to an end that is of the inductor L1 and that is close to the switch transistor T4 after being transmitted by the direct current load and a diode in the switch transistor T4. It can be learned that the second output voltage of the charging system 11 is equal to the voltage of the inductor L1. The MCU 111 can control the voltage of the inductor L1 by controlling charging time of the inductor L1 in stage 1, so as to control the second output voltage. The second output voltage may be greater than the battery voltage, or may be less than the battery voltage.

Similar to Embodiment 2, when the battery voltage of the power battery 12 falls within the working voltage range of the direct current load, the MCU 111 may turn on the first end and the second end a of the switch K5, and turn on the switch K6, so that the power battery 12 can directly provide power to the direct current load. For implementation, refer to Embodiment 2. Details are not described again.

It is clear that one of ordinary skilled in the art can make various modifications and variations to this application without departing from the scope of this application. This application is intended to cover these modifications and variations of this application provided that they fall within the scope of the claims of the application and their equivalent technologies.

What is claimed is:

1. A charging system, comprising:
a motor control unit (MCU) having N bridge arms, wherein N is an integer greater than or equal to one, wherein high-potential ends of the N bridge arms are connected to a first power supply end and a first battery end of the charging system, wherein the first power supply end is configured to connect to a positive electrode of a direct current power supply, wherein the first battery end is configured to connect to a positive electrode of a power battery, wherein the direct current power supply is configured to output a power supply voltage, wherein the power battery is configured to receive a first output voltage of the charging system, wherein low-potential ends of the N bridge arms are connected to a second battery end of the charging system, and wherein the second battery end is configured to connect to a negative electrode of the power battery;
a first inductor having one end connected to a second power supply end, wherein the other end of the first inductor is connected to a middle point of a first bridge arm, wherein the second power supply end is configured to connect to a negative electrode of the direct current power supply, wherein the first bridge arm is any of the N bridge arms;
a first switch having a first end coupled to the second battery end and a second end coupled to the second power supply end;
a second switch including a first end coupled to the first battery end, a second end coupled to one end of the first inductor, and a third end coupled to the first power supply end, wherein the second switch is configured to switchably connect the first end of the second switch to either the second end of the second switch or the third end of the second switch; and
a third switch having a first end coupled to one end of the first inductor and a second end coupled to the second power supply end, and wherein
the first bridge arm and the first inductor constitute a voltage conversion circuit, and wherein the MCU is configured to:
turn on the first end and the third end of the second switch, turn on the third switch, and turn off the first switch and perform boost conversion on the power supply voltage by using the voltage conversion circuit;
output the power supply voltage obtained after boost conversion to the power battery as the first output voltage not less than a minimum charging voltage; and
turn on the first end and the second end of the second switch, turn off the third switch, and turn on the first switch and perform buck conversion on the power supply voltage by using the voltage conversion circuit, and output the power supply voltage obtained after buck conversion to the power battery as the first output voltage not greater than a maximum charging voltage.

2. The charging system according to claim 1, wherein the first bridge arm comprises:
a first switch transistor, wherein a first electrode of the first switch transistor is separately connected to the first battery end and the first power supply end, and
a second switch transistor, wherein a second electrode of the first switch transistor is connected to a first electrode of the second switch transistor, and wherein the middle point is located between the first switch transistor and the second switch transistor, and wherein when the power supply voltage is less than the minimum charging voltage, the MCU is further configured to:
turn on the first switch transistor, so that the first inductor is charged; and
turn off the first switch transistor, so that the first inductor discharges electricity.

3. The charging system according to claim 2, wherein the MCU is further configured to:
turn on the first switch when the power supply voltage falls within a charging voltage range of the power battery; and
turn off the first switch when the power supply voltage is beyond the charging voltage range of the power battery.

4. The charging system according to claim 1, wherein the charging system further comprises:
N first inductors, and
N third switches, wherein one end of each of the N third switches is connected to the second power supply end, wherein the other end of each of the N third switches is connected to one end of each of the N first inductors in a one-to-one correspondence, and wherein the other end of each of the N first inductors is connected to the N bridge arms in a one-to-one correspondence, and wherein
the N third switches are configured to:
be turned on when the power supply voltage is received; and
be turned off when receiving of the power supply voltage is stopped.

5. The charging system according to claim 2, wherein the MCU is further configured to:
turn on the first end and the second end of the second switch, and turn on the third switch;
turn on the first switch transistor, so that the first inductor is charged; and
turn off the first switch transistor, so that the first inductor discharges electricity.

6. The charging system according to claim 1, wherein the MCU is further configured to: when the power supply voltage falls within a charging voltage range of the power battery,
turn on the first end and the third end of the second switch; and
turn on the first switch.

7. A charging system, comprising:
a motor control unit (MCU) having N bridge arms, wherein N is an integer greater than or equal to one, wherein high-potential ends of the N bridge arms are connected to a first power supply end and a first battery end of the charging system, wherein the first power supply end is configured to connect to a positive electrode of a direct current load, wherein the first battery end is configured to connect to a positive electrode of a power battery, wherein the direct current load is configured to receive a second output voltage of the charging system, and wherein the power battery is configured to output a battery voltage to the charging system; wherein low-potential ends of the N bridge arms are connected to a second battery end of the charging system, and wherein the second battery end is configured to connect to a negative electrode of the power battery;
a first inductor having one end connected to a second power supply end, the other end of the first inductor is connected to a middle point of a first bridge arm, wherein the second power supply end is configured to connect to a negative electrode of the direct current load, wherein the first bridge arm is any of the N bridge arms;

a first switch having a first end coupled to the second battery end and a second end coupled to the second power supply end;

a second switch including a first end coupled to the first battery end, a second end coupled to one end of the first inductor, and a third end coupled to the first power supply end, wherein the second switch is configured to switchably connect the first end of the second switch to either the second end of the second switch or the third end of the second switch; and a third switch having a first end coupled to one end of the first inductor and a second end coupled to the second power supply end, and wherein the first bridge arm and the first inductor constitute a voltage conversion circuit, and the MCU is configured to:

turn on the first end and the third end of the second switch, turn on the third switch, and turn off the first switch and perform buck conversion on the battery voltage by using the voltage conversion circuit;

output the battery voltage obtained after buck conversion to the direct current load as the second output voltage not greater than a maximum working voltage; and turn on the first end and the second end of the second switch, turn off the third switch, and turn on the first switch and perform boost conversion on the battery voltage by using the voltage conversion circuit, and output the battery voltage obtained after boost conversion to the direct current load as the second output voltage not less than a minimum working voltage.

8. The charging system according to claim 7, wherein the first bridge arm comprises:

a first switch transistor, wherein a first electrode of the first switch transistor is separately connected to the first battery end and the first power supply end, and a second switch transistor, wherein a second electrode of the first switch transistor is connected to a first electrode of the second switch transistor, and wherein the middle point is located between the first switch transistor and the second switch transistor, and wherein when the battery voltage is greater than the maximum working voltage, the MCU is configured to:

turn on the second switch transistor, so that the first inductor is charged; and turn off the second switch transistor, so that the first inductor discharges electricity.

9. The charging system according to claim 8, wherein: the MCU is further configured to:

turn on the first switch when the battery voltage falls within a working voltage range of the direct current load; and turn off the first switch when the battery voltage is beyond the working voltage range of the direct current load.

10. The charging system according to claim 7, wherein the charging system further comprises:

N first inductors, and

N third switches, wherein one end of each of the N third switches is connected to the second power supply end, wherein the other end of each of the N third switches is connected to one end of each of the N first inductors in a one-to-one correspondence, and wherein the other end of each of the N first inductors is connected to the N bridge arms in a one-to-one correspondence, and wherein the N third switches are configured to:

be turned on when the second output voltage is output, and be turned off when outputting of the second output voltage is stopped.

11. The charging system according to claim 8, wherein the MCU is further configured to:

turn on the first end and the second end of the second switch, and turn on the third switch;

turn on the second switch transistor, so that the first inductor is charged; and turn off the second switch transistor, so that the first inductor discharges electricity.

12. The charging system according to claim 7, wherein the MCU is further configured to: when the battery voltage falls within a charging voltage range of the power battery, turn on the first end and the third end of the second switch; and turn on the first switch.

* * * * *